United States Patent
Meir et al.

(10) Patent No.: US 8,677,054 B1
(45) Date of Patent: Mar. 18, 2014

(54) MEMORY MANAGEMENT SCHEMES FOR NON-VOLATILE MEMORY DEVICES

(75) Inventors: Avraham Meir, Rishon Lezion (IL); Oren Golov, Hod-Hasharon (IL)

(73) Assignee: Apple Inc., Cupertino, CA (US)

( * ) Notice: Subject to any disclaimer, the term of this patent is extended or adjusted under 35 U.S.C. 154(b) by 577 days.

(21) Appl. No.: 12/963,649

(22) Filed: Dec. 9, 2010

Related U.S. Application Data (60) Provisional application No. 61/286,814, filed on Dec. 16, 2009, provisional application No. 61/326,858, filed on Apr. 22, 2010.

(51) Int. Cl.
*G06F 12/00* (2006.01)

(52) U.S. Cl.
USPC ............... 711/103; 711/159; 707/817

(58) Field of Classification Search
USPC .......................................... 711/103
See application file for complete search history.

(56) References Cited

U.S. PATENT DOCUMENTS

| | | |
|---|---|---|
| 3,668,631 A | 6/1972 | Griffith et al. |
| 3,668,632 A | 6/1972 | Oldham |
| 4,058,851 A | 11/1977 | Scheuneman |
| 4,112,502 A | 9/1978 | Scheuneman |
| 4,394,763 A | 7/1983 | Nagano et al. |
| 4,413,339 A | 11/1983 | Riggle et al. |
| 4,556,961 A | 12/1985 | Iwahashi et al. |
| 4,558,431 A | 12/1985 | Satoh |
| 4,608,687 A | 8/1986 | Dutton |
| 4,654,847 A | 3/1987 | Dutton |
| 4,661,929 A | 4/1987 | Aoki et al. |
| 4,768,171 A | 8/1988 | Tada |
| 4,811,285 A | 3/1989 | Walker et al. |
| 4,899,342 A | 2/1990 | Potter et al. |
| 4,910,706 A | 3/1990 | Hyatt |
| 4,993,029 A | 2/1991 | Galbraith et al. |

(Continued)

FOREIGN PATENT DOCUMENTS

| | | |
|---|---|---|
| EP | 0783754 B1 | 7/1997 |
| EP | 1434236 B1 | 6/2004 |

(Continued)

OTHER PUBLICATIONS

Ankolekar et al., "Multibit Error-Correction Methods for Latency-Constrained Flash Memory Systems", IEEE Transactions on Device and Materials Reliability, vol. 10, No. 1, pp. 33-39, Mar. 2010.

(Continued)

*Primary Examiner* — Reginald Bragdon
*Assistant Examiner* — Mehdi Namazi
(74) *Attorney, Agent, or Firm* — Meyertons, Hood, Kivlin, Kowert & Goetzel, P.C.

(57) ABSTRACT

A method includes storing data in a non-volatile memory that includes multiple memory blocks. At least first and second regions are defined in the non-volatile memory. A definition is made of a first over-provisioning ratio between a first logical address space and a first physical memory space of the first region, and a second over-provisioning ratio, different from the first over-provisioning ratio, between a second logical address space and a second physical memory space of the second region. Portions of the data are compacted, individually within each of the first and second regions and independently of the other region, by copying the portions from one or more source memory blocks to one or more destination memory blocks using the first and second over-provisioning ratios, respectively.

20 Claims, 5 Drawing Sheets

(56) References Cited

U.S. PATENT DOCUMENTS

| | | | |
|---|---|---|---|
| 5,056,089 | A | 10/1991 | Furuta et al. |
| 5,077,722 | A | 12/1991 | Geist et al. |
| 5,126,808 | A | 6/1992 | Montalvo et al. |
| 5,163,021 | A | 11/1992 | Mehrotra et al. |
| 5,172,338 | A | 12/1992 | Mehrotra et al. |
| 5,182,558 | A | 1/1993 | Mayo |
| 5,182,752 | A | 1/1993 | DeRoo et al. |
| 5,191,584 | A | 3/1993 | Anderson |
| 5,200,959 | A | 4/1993 | Gross et al. |
| 5,237,535 | A | 8/1993 | Mielke et al. |
| 5,272,669 | A | 12/1993 | Samachisa et al. |
| 5,276,649 | A | 1/1994 | Hoshita et al. |
| 5,287,469 | A | 2/1994 | Tsuboi |
| 5,365,484 | A | 11/1994 | Cleveland et al. |
| 5,388,064 | A | 2/1995 | Khan |
| 5,416,646 | A | 5/1995 | Shirai |
| 5,416,782 | A | 5/1995 | Wells et al. |
| 5,446,854 | A | 8/1995 | Khalidi et al. |
| 5,450,424 | A | 9/1995 | Okugaki et al. |
| 5,469,444 | A | 11/1995 | Endoh et al. |
| 5,473,753 | A | 12/1995 | Wells et al. |
| 5,479,170 | A | 12/1995 | Cauwenberghs et al. |
| 5,508,958 | A | 4/1996 | Fazio et al. |
| 5,519,831 | A | 5/1996 | Holzhammer |
| 5,532,962 | A | 7/1996 | Auclair et al. |
| 5,533,190 | A | 7/1996 | Binford et al. |
| 5,541,886 | A | 7/1996 | Hasbun |
| 5,600,677 | A | 2/1997 | Citta et al. |
| 5,638,320 | A | 6/1997 | Wong et al. |
| 5,657,332 | A | 8/1997 | Auclair et al. |
| 5,675,540 | A | 10/1997 | Roohparvar |
| 5,682,352 | A | 10/1997 | Wong et al. |
| 5,687,114 | A | 11/1997 | Khan |
| 5,696,717 | A | 12/1997 | Koh |
| 5,726,649 | A | 3/1998 | Tamaru et al. |
| 5,726,934 | A | 3/1998 | Tran et al. |
| 5,742,752 | A | 4/1998 | De Koning |
| 5,748,533 | A | 5/1998 | Dunlap et al. |
| 5,748,534 | A | 5/1998 | Dunlap et al. |
| 5,751,637 | A | 5/1998 | Chen et al. |
| 5,761,402 | A | 6/1998 | Kaneda et al. |
| 5,798,966 | A | 8/1998 | Keeney |
| 5,799,200 | A | 8/1998 | Brant et al. |
| 5,801,985 | A | 9/1998 | Roohparvar et al. |
| 5,838,832 | A | 11/1998 | Barnsley |
| 5,860,106 | A | 1/1999 | Domen et al. |
| 5,867,114 | A | 2/1999 | Barbir |
| 5,867,428 | A | 2/1999 | Ishii et al. |
| 5,867,429 | A | 2/1999 | Chen et al. |
| 5,877,986 | A | 3/1999 | Harari et al. |
| 5,889,937 | A | 3/1999 | Tamagawa |
| 5,901,089 | A | 5/1999 | Korsh et al. |
| 5,909,449 | A | 6/1999 | So et al. |
| 5,912,906 | A | 6/1999 | Wu et al. |
| 5,930,167 | A | 7/1999 | Lee et al. |
| 5,937,424 | A | 8/1999 | Leak et al. |
| 5,942,004 | A | 8/1999 | Cappelletti |
| 5,946,716 | A | 8/1999 | Karp et al. |
| 5,969,986 | A | 10/1999 | Wong et al. |
| 5,982,668 | A | 11/1999 | Ishii et al. |
| 5,991,517 | A | 11/1999 | Harari et al. |
| 5,995,417 | A | 11/1999 | Chen et al. |
| 6,009,014 | A | 12/1999 | Hollmer et al. |
| 6,009,016 | A | 12/1999 | Ishii et al. |
| 6,023,425 | A | 2/2000 | Ishii et al. |
| 6,034,891 | A | 3/2000 | Norman |
| 6,040,993 | A | 3/2000 | Chen et al. |
| 6,041,430 | A | 3/2000 | Yamauchi |
| 6,073,204 | A | 6/2000 | Lakhani et al. |
| 6,101,614 | A | 8/2000 | Gonzales et al. |
| 6,128,237 | A | 10/2000 | Shirley et al. |
| 6,134,140 | A | 10/2000 | Tanaka et al. |
| 6,134,143 | A | 10/2000 | Norman |
| 6,134,631 | A | 10/2000 | Jennings |
| 6,141,261 | A | 10/2000 | Patti |
| 6,151,246 | A | 11/2000 | So et al. |
| 6,157,573 | A | 12/2000 | Ishii et al. |
| 6,166,962 | A | 12/2000 | Chen et al. |
| 6,169,691 | B1 | 1/2001 | Pasotti et al. |
| 6,178,466 | B1 | 1/2001 | Gilbertson et al. |
| 6,185,134 | B1 | 2/2001 | Tanaka et al. |
| 6,209,113 | B1 | 3/2001 | Roohparvar |
| 6,212,654 | B1 | 4/2001 | Lou et al. |
| 6,219,276 | B1 | 4/2001 | Parker |
| 6,219,447 | B1 | 4/2001 | Lee et al. |
| 6,222,762 | B1 | 4/2001 | Guterman et al. |
| 6,230,233 | B1 | 5/2001 | Lofgren et al. |
| 6,240,458 | B1 | 5/2001 | Gilbertson |
| 6,259,627 | B1 | 7/2001 | Wong |
| 6,275,419 | B1 | 8/2001 | Guterman et al. |
| 6,278,632 | B1 | 8/2001 | Chevallier |
| 6,279,069 | B1 | 8/2001 | Robinson et al. |
| 6,288,944 | B1 | 9/2001 | Kawamura |
| 6,292,394 | B1 | 9/2001 | Cohen et al. |
| 6,301,151 | B1 | 10/2001 | Engh et al. |
| 6,304,486 | B1 | 10/2001 | Yano |
| 6,307,776 | B1 | 10/2001 | So et al. |
| 6,314,044 | B1 | 11/2001 | Sasaki et al. |
| 6,317,363 | B1 | 11/2001 | Guterman et al. |
| 6,317,364 | B1 | 11/2001 | Guterman et al. |
| 6,345,004 | B1 | 2/2002 | Omura et al. |
| 6,360,346 | B1 | 3/2002 | Miyauchi et al. |
| 6,363,008 | B1 | 3/2002 | Wong |
| 6,363,454 | B1 | 3/2002 | Lakhani et al. |
| 6,366,496 | B1 | 4/2002 | Torelli et al. |
| 6,385,092 | B1 | 5/2002 | Ishii et al. |
| 6,392,932 | B1 | 5/2002 | Ishii et al. |
| 6,396,742 | B1 | 5/2002 | Korsh et al. |
| 6,397,364 | B1 | 5/2002 | Barkan |
| 6,405,323 | B1 | 6/2002 | Lin et al. |
| 6,405,342 | B1 | 6/2002 | Lee |
| 6,418,060 | B1 | 7/2002 | Yong et al. |
| 6,442,585 | B1 | 8/2002 | Dean et al. |
| 6,445,602 | B1 | 9/2002 | Kokudo et al. |
| 6,452,838 | B1 | 9/2002 | Ishii et al. |
| 6,456,528 | B1 | 9/2002 | Chen |
| 6,466,476 | B1 | 10/2002 | Wong et al. |
| 6,467,062 | B1 | 10/2002 | Barkan |
| 6,469,931 | B1 | 10/2002 | Ban et al. |
| 6,480,948 | B1 | 11/2002 | Virajpet et al. |
| 6,490,236 | B1 | 12/2002 | Fukuda et al. |
| 6,522,580 | B2 | 2/2003 | Chen et al. |
| 6,525,952 | B2 | 2/2003 | Araki et al. |
| 6,532,556 | B1 | 3/2003 | Wong et al. |
| 6,538,922 | B1 | 3/2003 | Khalid et al. |
| 6,549,464 | B2 | 4/2003 | Tanaka et al. |
| 6,553,510 | B1 | 4/2003 | Pekny |
| 6,558,967 | B1 | 5/2003 | Wong |
| 6,560,152 | B1 | 5/2003 | Cernea |
| 6,567,311 | B2 | 5/2003 | Ishii et al. |
| 6,577,539 | B2 | 6/2003 | Iwahashi |
| 6,584,012 | B2 | 6/2003 | Banks |
| 6,615,307 | B1 | 9/2003 | Roohparvar |
| 6,621,739 | B2 | 9/2003 | Gonzalez et al. |
| 6,640,326 | B1 | 10/2003 | Buckingham et al. |
| 6,643,169 | B2 | 11/2003 | Rudelic et al. |
| 6,646,913 | B2 | 11/2003 | Micheloni et al. |
| 6,678,192 | B2 | 1/2004 | Gongwer et al. |
| 6,683,811 | B2 | 1/2004 | Ishii et al. |
| 6,687,155 | B2 | 2/2004 | Nagasue |
| 6,707,748 | B2 | 3/2004 | Lin et al. |
| 6,708,257 | B2 | 3/2004 | Bao |
| 6,714,449 | B2 | 3/2004 | Khalid |
| 6,717,847 | B2 | 4/2004 | Chen |
| 6,731,557 | B2 | 5/2004 | Beretta |
| 6,732,250 | B2 | 5/2004 | Durrant |
| 6,738,293 | B1 | 5/2004 | Iwahashi |
| 6,751,766 | B2 | 6/2004 | Guterman et al. |
| 6,757,193 | B2 | 6/2004 | Chen et al. |
| 6,774,808 | B1 | 8/2004 | Hibbs et al. |
| 6,781,877 | B2 | 8/2004 | Cernea et al. |
| 6,804,805 | B2 | 10/2004 | Rub |
| 6,807,095 | B2 | 10/2004 | Chen et al. |
| 6,807,101 | B2 | 10/2004 | Ooishi et al. |

(56) References Cited

U.S. PATENT DOCUMENTS

| | | | |
|---|---|---|---|
| 6,809,964 B2 | 10/2004 | Moschopoulos et al. |
| 6,819,592 B2 | 11/2004 | Noguchi et al. |
| 6,829,167 B2 | 12/2004 | Tu et al. |
| 6,845,052 B1 | 1/2005 | Ho et al. |
| 6,851,018 B2 | 2/2005 | Wyatt et al. |
| 6,851,081 B2 | 2/2005 | Yamamoto |
| 6,856,546 B2 | 2/2005 | Guterman et al. |
| 6,862,218 B2 | 3/2005 | Guterman et al. |
| 6,870,767 B2 | 3/2005 | Rudelic et al. |
| 6,870,773 B2 | 3/2005 | Noguchi et al. |
| 6,873,552 B2 | 3/2005 | Ishii et al. |
| 6,879,520 B2 | 4/2005 | Hosono et al. |
| 6,882,567 B1 | 4/2005 | Wong |
| 6,894,926 B2 | 5/2005 | Guterman et al. |
| 6,907,497 B2 | 6/2005 | Hosono et al. |
| 6,925,009 B2 | 8/2005 | Noguchi et al. |
| 6,930,925 B2 | 8/2005 | Guo et al. |
| 6,934,188 B2 | 8/2005 | Roohparvar |
| 6,937,511 B2 | 8/2005 | Hsu et al. |
| 6,958,938 B2 | 10/2005 | Noguchi et al. |
| 6,963,505 B2 | 11/2005 | Cohen |
| 6,972,993 B2 | 12/2005 | Conley et al. |
| 6,973,531 B1 * | 12/2005 | Chang et al. ............ 711/103 |
| 6,988,175 B2 | 1/2006 | Lasser |
| 6,992,932 B2 | 1/2006 | Cohen |
| 6,999,344 B2 | 2/2006 | Hosono et al. |
| 7,002,843 B2 | 2/2006 | Guterman et al. |
| 7,006,379 B2 | 2/2006 | Noguchi et al. |
| 7,012,835 B2 | 3/2006 | Gonzalez et al. |
| 7,020,017 B2 | 3/2006 | Chen et al. |
| 7,023,735 B2 | 4/2006 | Ban et al. |
| 7,031,210 B2 | 4/2006 | Park et al. |
| 7,031,214 B2 | 4/2006 | Tran |
| 7,031,216 B2 | 4/2006 | You |
| 7,039,846 B2 | 5/2006 | Hewitt et al. |
| 7,042,766 B1 | 5/2006 | Wang et al. |
| 7,054,193 B1 | 5/2006 | Wong |
| 7,054,199 B2 | 5/2006 | Lee et al. |
| 7,057,958 B2 | 6/2006 | So et al. |
| 7,065,147 B2 | 6/2006 | Ophir et al. |
| 7,068,539 B2 | 6/2006 | Guterman et al. |
| 7,071,849 B2 | 7/2006 | Zhang |
| 7,072,222 B2 | 7/2006 | Ishii et al. |
| 7,079,555 B2 | 7/2006 | Baydar et al. |
| 7,088,615 B2 | 8/2006 | Guterman et al. |
| 7,099,194 B2 | 8/2006 | Tu et al. |
| 7,102,924 B2 | 9/2006 | Chen et al. |
| 7,113,432 B2 | 9/2006 | Mokhlesi |
| 7,130,210 B2 | 10/2006 | Bathul et al. |
| 7,139,192 B1 | 11/2006 | Wong |
| 7,139,198 B2 | 11/2006 | Guterman et al. |
| 7,145,805 B2 | 12/2006 | Ishii et al. |
| 7,151,692 B2 | 12/2006 | Wu et al. |
| 7,158,058 B1 | 1/2007 | Yu |
| 7,170,781 B2 | 1/2007 | So et al. |
| 7,170,802 B2 | 1/2007 | Cernea et al. |
| 7,173,859 B2 | 2/2007 | Hemink |
| 7,177,184 B2 | 2/2007 | Chen |
| 7,177,195 B2 | 2/2007 | Gonzalez et al. |
| 7,177,199 B2 | 2/2007 | Chen et al. |
| 7,177,200 B2 | 2/2007 | Ronen et al. |
| 7,184,338 B2 | 2/2007 | Nakagawa et al. |
| 7,187,195 B2 | 3/2007 | Kim |
| 7,187,592 B2 | 3/2007 | Guterman et al. |
| 7,190,614 B2 | 3/2007 | Wu |
| 7,193,898 B2 | 3/2007 | Cernea |
| 7,193,921 B2 | 3/2007 | Choi et al. |
| 7,196,644 B1 | 3/2007 | Anderson et al. |
| 7,196,928 B2 | 3/2007 | Chen |
| 7,196,933 B2 | 3/2007 | Shibata |
| 7,197,594 B2 | 3/2007 | Raz et al. |
| 7,200,062 B2 | 4/2007 | Kinsely et al. |
| 7,210,077 B2 | 4/2007 | Brandenberger et al. |
| 7,221,592 B2 | 5/2007 | Nazarian |
| 7,224,613 B2 | 5/2007 | Chen et al. |
| 7,231,474 B1 | 6/2007 | Helms et al. |
| 7,231,562 B2 | 6/2007 | Ohlhoff et al. |
| 7,243,275 B2 | 7/2007 | Gongwer et al. |
| 7,254,690 B2 | 8/2007 | Rao |
| 7,254,763 B2 | 8/2007 | Aadsen et al. |
| 7,257,027 B2 | 8/2007 | Park |
| 7,259,987 B2 | 8/2007 | Chen et al. |
| 7,266,026 B2 | 9/2007 | Gongwer et al. |
| 7,266,069 B2 | 9/2007 | Chu |
| 7,269,066 B2 | 9/2007 | Nguyen et al. |
| 7,272,757 B2 | 9/2007 | Stocken |
| 7,274,611 B2 | 9/2007 | Roohparvar |
| 7,277,355 B2 | 10/2007 | Tanzawa |
| 7,280,398 B1 | 10/2007 | Lee et al. |
| 7,280,409 B2 | 10/2007 | Misumi et al. |
| 7,280,415 B2 | 10/2007 | Hwang et al. |
| 7,283,399 B2 | 10/2007 | Ishii et al. |
| 7,289,344 B2 | 10/2007 | Chen |
| 7,301,807 B2 | 11/2007 | Khalid et al. |
| 7,301,817 B2 | 11/2007 | Li et al. |
| 7,308,525 B2 | 12/2007 | Lasser et al. |
| 7,310,255 B2 | 12/2007 | Chan |
| 7,310,269 B2 | 12/2007 | Shibata |
| 7,310,271 B2 | 12/2007 | Lee |
| 7,310,272 B1 | 12/2007 | Mokhlesi et al. |
| 7,310,347 B2 | 12/2007 | Lasser |
| 7,312,727 B1 | 12/2007 | Feng et al. |
| 7,321,509 B2 | 1/2008 | Chen et al. |
| 7,328,384 B1 | 2/2008 | Kulkarni et al. |
| 7,342,831 B2 | 3/2008 | Mokhlesi et al. |
| 7,343,330 B1 | 3/2008 | Boesjes et al. |
| 7,345,924 B2 | 3/2008 | Nguyen et al. |
| 7,345,928 B2 | 3/2008 | Li |
| 7,349,263 B2 | 3/2008 | Kim et al. |
| 7,356,755 B2 | 4/2008 | Fackenthal |
| 7,363,420 B2 | 4/2008 | Lin et al. |
| 7,365,671 B1 | 4/2008 | Anderson |
| 7,388,781 B2 | 6/2008 | Litsyn et al. |
| 7,397,697 B2 | 7/2008 | So et al. |
| 7,405,974 B2 | 7/2008 | Yaoi et al. |
| 7,405,979 B2 | 7/2008 | Ishii et al. |
| 7,408,804 B2 | 8/2008 | Hemink et al. |
| 7,408,810 B2 | 8/2008 | Aritome et al. |
| 7,409,473 B2 | 8/2008 | Conley et al. |
| 7,409,623 B2 | 8/2008 | Baker et al. |
| 7,420,847 B2 | 9/2008 | Li |
| 7,433,231 B2 | 10/2008 | Aritome |
| 7,433,697 B2 | 10/2008 | Karaoguz et al. |
| 7,434,111 B2 | 10/2008 | Sugiura et al. |
| 7,437,498 B2 | 10/2008 | Ronen |
| 7,440,324 B2 | 10/2008 | Mokhlesi |
| 7,440,331 B2 | 10/2008 | Hemink |
| 7,441,067 B2 | 10/2008 | Gorobets et al. |
| 7,447,970 B2 | 11/2008 | Wu et al. |
| 7,450,421 B2 | 11/2008 | Mokhesi et al. |
| 7,453,737 B2 | 11/2008 | Ha |
| 7,457,163 B2 | 11/2008 | Hemink |
| 7,457,897 B1 | 11/2008 | Lee et al. |
| 7,460,410 B2 | 12/2008 | Nagai et al. |
| 7,460,412 B2 | 12/2008 | Lee et al. |
| 7,466,592 B2 | 12/2008 | Mitani et al. |
| 7,468,907 B2 | 12/2008 | Kang et al. |
| 7,468,911 B2 | 12/2008 | Lutze et al. |
| 7,469,049 B1 | 12/2008 | Feng |
| 7,471,581 B2 | 12/2008 | Tran et al. |
| 7,483,319 B2 | 1/2009 | Brown |
| 7,487,329 B2 | 2/2009 | Hepkin et al. |
| 7,487,394 B2 | 2/2009 | Forhan et al. |
| 7,492,641 B2 | 2/2009 | Hosono et al. |
| 7,508,710 B2 | 3/2009 | Mokhlesi |
| 7,526,711 B2 | 4/2009 | Orio |
| 7,539,061 B2 | 5/2009 | Lee |
| 7,539,062 B2 | 5/2009 | Doyle |
| 7,551,492 B2 | 6/2009 | Kim |
| 7,558,109 B2 | 7/2009 | Brandman et al. |
| 7,558,839 B1 | 7/2009 | McGovern |
| 7,568,135 B2 | 7/2009 | Cornwell et al. |
| 7,570,520 B2 | 8/2009 | Kamei et al. |
| 7,574,555 B2 | 8/2009 | Porat et al. |

(56) References Cited

U.S. PATENT DOCUMENTS

| | | |
|---|---|---|
| 7,590,002 B2 | 9/2009 | Mokhlesi et al. |
| 7,593,259 B2 | 9/2009 | Kim |
| 7,594,093 B1 | 9/2009 | Kancherla |
| 7,596,707 B1 | 9/2009 | Vemula |
| 7,609,787 B2 | 10/2009 | Jahan et al. |
| 7,613,043 B2 | 11/2009 | Cornwell et al. |
| 7,616,498 B2 | 11/2009 | Mokhlesi et al. |
| 7,619,918 B2 | 11/2009 | Aritome |
| 7,631,245 B2 | 12/2009 | Lasser |
| 7,633,798 B2 | 12/2009 | Sarin et al. |
| 7,633,802 B2 | 12/2009 | Mokhlesi |
| 7,639,532 B2 | 12/2009 | Roohparvar et al. |
| 7,644,347 B2 | 1/2010 | Alexander et al. |
| 7,656,734 B2 | 2/2010 | Thorp et al. |
| 7,660,158 B2 | 2/2010 | Aritome |
| 7,660,183 B2 | 2/2010 | Ware et al. |
| 7,661,000 B2 | 2/2010 | Ueda et al. |
| 7,661,054 B2 | 2/2010 | Huffman et al. |
| 7,665,007 B2 | 2/2010 | Yang et al. |
| 7,680,987 B1 | 3/2010 | Clark et al. |
| 7,733,712 B1 | 6/2010 | Walston et al. |
| 7,742,351 B2 | 6/2010 | Inoue et al. |
| 7,761,624 B2 | 7/2010 | Karamcheti et al. |
| 7,797,609 B2 | 9/2010 | Neuman |
| 7,810,017 B2 | 10/2010 | Radke |
| 7,848,149 B2 | 12/2010 | Gonzalez et al. |
| 7,869,273 B2 | 1/2011 | Lee et al. |
| 7,885,119 B2 | 2/2011 | Li |
| 7,904,783 B2 | 3/2011 | Brandman et al. |
| 7,928,497 B2 | 4/2011 | Yaegashi |
| 7,929,549 B1 | 4/2011 | Talbot |
| 7,930,515 B2 | 4/2011 | Gupta et al. |
| 7,945,825 B2 | 5/2011 | Cohen et al. |
| 7,978,516 B2 | 7/2011 | Olbrich et al. |
| 8,014,094 B1 | 9/2011 | Jin |
| 8,037,380 B2 | 10/2011 | Cagno et al. |
| 8,040,744 B2 | 10/2011 | Gorobets et al. |
| 8,065,583 B2 | 11/2011 | Radke |
| 8,479,080 B1 * | 7/2013 | Shalvi et al. ............... 714/774 |
| 2001/0002172 A1 | 5/2001 | Tanaka et al. |
| 2001/0006479 A1 | 7/2001 | Ikehashi et al. |
| 2002/0038440 A1 | 3/2002 | Barkan |
| 2002/0056064 A1 | 5/2002 | Kidorf et al. |
| 2002/0118574 A1 | 8/2002 | Gongwer et al. |
| 2002/0133684 A1 | 9/2002 | Anderson |
| 2002/0166091 A1 | 11/2002 | Kidorf et al. |
| 2002/0174295 A1 | 11/2002 | Ulrich et al. |
| 2002/0196510 A1 | 12/2002 | Hietala et al. |
| 2003/0002348 A1 | 1/2003 | Chen et al. |
| 2003/0103400 A1 | 6/2003 | Van Tran |
| 2003/0161183 A1 | 8/2003 | Tran |
| 2003/0189856 A1 | 10/2003 | Cho et al. |
| 2004/0057265 A1 | 3/2004 | Mirabel et al. |
| 2004/0057285 A1 | 3/2004 | Cernea et al. |
| 2004/0083333 A1 | 4/2004 | Chang et al. |
| 2004/0083334 A1 | 4/2004 | Chang et al. |
| 2004/0105311 A1 | 6/2004 | Cernea et al. |
| 2004/0114437 A1 | 6/2004 | Li |
| 2004/0160842 A1 | 8/2004 | Fukiage |
| 2004/0223371 A1 | 11/2004 | Roohparvar |
| 2005/0007802 A1 | 1/2005 | Gerpheide |
| 2005/0013165 A1 | 1/2005 | Ban |
| 2005/0024941 A1 | 2/2005 | Lasser et al. |
| 2005/0024978 A1 | 2/2005 | Ronen |
| 2005/0030788 A1 | 2/2005 | Parkinson et al. |
| 2005/0086574 A1 | 4/2005 | Fackenthal |
| 2005/0121436 A1 | 6/2005 | Kamitani et al. |
| 2005/0144361 A1 | 6/2005 | Gonzalez et al. |
| 2005/0157555 A1 | 7/2005 | Ono et al. |
| 2005/0162913 A1 | 7/2005 | Chen |
| 2005/0169051 A1 | 8/2005 | Khalid et al. |
| 2005/0189649 A1 | 9/2005 | Maruyama et al. |
| 2005/0213393 A1 | 9/2005 | Lasser |
| 2005/0224853 A1 | 10/2005 | Ohkawa |
| 2005/0240745 A1 | 10/2005 | Iyer et al. |
| 2005/0243626 A1 | 11/2005 | Ronen |
| 2006/0004952 A1 | 1/2006 | Lasser |
| 2006/0028875 A1 | 2/2006 | Avraham et al. |
| 2006/0028877 A1 | 2/2006 | Meir |
| 2006/0101193 A1 | 5/2006 | Murin |
| 2006/0106972 A1 | 5/2006 | Gorobets et al. |
| 2006/0107136 A1 | 5/2006 | Gongwer et al. |
| 2006/0129750 A1 | 6/2006 | Lee et al. |
| 2006/0133141 A1 | 6/2006 | Gorobets |
| 2006/0156189 A1 | 7/2006 | Tomlin |
| 2006/0179334 A1 | 8/2006 | Brittain et al. |
| 2006/0190699 A1 | 8/2006 | Lee |
| 2006/0203546 A1 | 9/2006 | Lasser |
| 2006/0218359 A1 | 9/2006 | Sanders et al. |
| 2006/0221692 A1 | 10/2006 | Chen |
| 2006/0221705 A1 | 10/2006 | Hemink et al. |
| 2006/0221714 A1 | 10/2006 | Li et al. |
| 2006/0239077 A1 | 10/2006 | Park et al. |
| 2006/0239081 A1 | 10/2006 | Roohparvar |
| 2006/0256620 A1 | 11/2006 | Nguyen et al. |
| 2006/0256626 A1 | 11/2006 | Werner et al. |
| 2006/0256891 A1 | 11/2006 | Yuan et al. |
| 2006/0271748 A1 | 11/2006 | Jain et al. |
| 2006/0285392 A1 | 12/2006 | Incarnati et al. |
| 2006/0285396 A1 | 12/2006 | Ha |
| 2007/0006013 A1 | 1/2007 | Moshayedi et al. |
| 2007/0019481 A1 | 1/2007 | Park |
| 2007/0033581 A1 | 2/2007 | Tomlin et al. |
| 2007/0047314 A1 | 3/2007 | Goda et al. |
| 2007/0047326 A1 | 3/2007 | Nguyen et al. |
| 2007/0050536 A1 | 3/2007 | Kolokowsky |
| 2007/0058446 A1 | 3/2007 | Hwang et al. |
| 2007/0061502 A1 | 3/2007 | Lasser et al. |
| 2007/0067667 A1 | 3/2007 | Ikeuchi et al. |
| 2007/0074093 A1 | 3/2007 | Lasser |
| 2007/0086239 A1 | 4/2007 | Litsyn et al. |
| 2007/0086260 A1 | 4/2007 | Sinclair |
| 2007/0089034 A1 | 4/2007 | Litsyn et al. |
| 2007/0091677 A1 | 4/2007 | Lasser et al. |
| 2007/0091694 A1 | 4/2007 | Lee et al. |
| 2007/0103978 A1 | 5/2007 | Conley et al. |
| 2007/0103986 A1 | 5/2007 | Chen |
| 2007/0104211 A1 | 5/2007 | Opsasnick |
| 2007/0109845 A1 | 5/2007 | Chen |
| 2007/0109849 A1 | 5/2007 | Chen |
| 2007/0115726 A1 | 5/2007 | Cohen et al. |
| 2007/0118713 A1 | 5/2007 | Guterman et al. |
| 2007/0143378 A1 | 6/2007 | Gorobets |
| 2007/0143531 A1 | 6/2007 | Atri |
| 2007/0159889 A1 | 7/2007 | Kang et al. |
| 2007/0159892 A1 | 7/2007 | Kang et al. |
| 2007/0159907 A1 | 7/2007 | Kwak |
| 2007/0168837 A1 | 7/2007 | Murin |
| 2007/0171714 A1 | 7/2007 | Wu et al. |
| 2007/0183210 A1 | 8/2007 | Choi et al. |
| 2007/0189073 A1 | 8/2007 | Aritome |
| 2007/0195602 A1 | 8/2007 | Fong et al. |
| 2007/0206426 A1 | 9/2007 | Mokhlesi |
| 2007/0208904 A1 | 9/2007 | Hsieh et al. |
| 2007/0226599 A1 | 9/2007 | Motwani |
| 2007/0236990 A1 | 10/2007 | Aritome |
| 2007/0253249 A1 | 11/2007 | Kang et al. |
| 2007/0256620 A1 | 11/2007 | Viggiano et al. |
| 2007/0263455 A1 | 11/2007 | Cornwell et al. |
| 2007/0266232 A1 | 11/2007 | Rodgers et al. |
| 2007/0271424 A1 | 11/2007 | Lee et al. |
| 2007/0280000 A1 | 12/2007 | Fujiu et al. |
| 2007/0291571 A1 | 12/2007 | Balasundaram |
| 2007/0297234 A1 | 12/2007 | Cernea et al. |
| 2008/0010395 A1 | 1/2008 | Mylly et al. |
| 2008/0025121 A1 | 1/2008 | Tanzawa |
| 2008/0043535 A1 | 2/2008 | Roohparvar |
| 2008/0049504 A1 | 2/2008 | Kasahara et al. |
| 2008/0049506 A1 | 2/2008 | Guterman |
| 2008/0052446 A1 | 2/2008 | Lasser et al. |
| 2008/0055993 A1 | 3/2008 | Lee |
| 2008/0080243 A1 | 4/2008 | Edahiro et al. |
| 2008/0082730 A1 | 4/2008 | Kim et al. |
| 2008/0089123 A1 | 4/2008 | Chae et al. |

(56) References Cited

U.S. PATENT DOCUMENTS

| | | |
|---|---|---|
| 2008/0104309 A1 | 5/2008 | Cheon et al. |
| 2008/0104312 A1 | 5/2008 | Lasser |
| 2008/0109590 A1 | 5/2008 | Jung et al. |
| 2008/0115017 A1 | 5/2008 | Jacobson |
| 2008/0123420 A1 | 5/2008 | Brandman et al. |
| 2008/0123426 A1 | 5/2008 | Lutze et al. |
| 2008/0126686 A1 | 5/2008 | Sokolov et al. |
| 2008/0130341 A1 | 6/2008 | Shalvi et al. |
| 2008/0148115 A1 | 6/2008 | Sokolov et al. |
| 2008/0151618 A1 | 6/2008 | Sharon et al. |
| 2008/0151667 A1 | 6/2008 | Miu et al. |
| 2008/0158958 A1 | 7/2008 | Sokolov et al. |
| 2008/0181001 A1 | 7/2008 | Shalvi |
| 2008/0198650 A1 | 8/2008 | Shalvi et al. |
| 2008/0198654 A1 | 8/2008 | Toda |
| 2008/0209116 A1 | 8/2008 | Caulkins |
| 2008/0209304 A1 | 8/2008 | Winarski et al. |
| 2008/0215798 A1 | 9/2008 | Sharon et al. |
| 2008/0219050 A1 | 9/2008 | Shalvi et al. |
| 2008/0239093 A1 | 10/2008 | Easwar et al. |
| 2008/0239812 A1 | 10/2008 | Abiko et al. |
| 2008/0253188 A1 | 10/2008 | Aritome |
| 2008/0263262 A1 | 10/2008 | Sokolov et al. |
| 2008/0263676 A1 | 10/2008 | Mo et al. |
| 2008/0270730 A1 | 10/2008 | Lasser et al. |
| 2008/0282106 A1 | 11/2008 | Shalvi et al. |
| 2008/0288714 A1 | 11/2008 | Salomon et al. |
| 2009/0013233 A1 | 1/2009 | Radke |
| 2009/0024905 A1 | 1/2009 | Shalvi et al. |
| 2009/0034337 A1 | 2/2009 | Aritome |
| 2009/0043831 A1 | 2/2009 | Antonopoulos et al. |
| 2009/0043951 A1 | 2/2009 | Shalvi et al. |
| 2009/0049234 A1 | 2/2009 | Oh et al. |
| 2009/0073762 A1 | 3/2009 | Lee et al. |
| 2009/0086542 A1 | 4/2009 | Lee et al. |
| 2009/0089484 A1 | 4/2009 | Chu |
| 2009/0091979 A1 | 4/2009 | Shalvi |
| 2009/0094930 A1 | 4/2009 | Schwoerer |
| 2009/0106485 A1 | 4/2009 | Anholt |
| 2009/0112949 A1 | 4/2009 | Ergan et al. |
| 2009/0132755 A1 | 5/2009 | Radke |
| 2009/0144600 A1 | 6/2009 | Perlmutter et al. |
| 2009/0150894 A1 | 6/2009 | Huang et al. |
| 2009/0157950 A1 | 6/2009 | Selinger |
| 2009/0157964 A1 | 6/2009 | Kasorla et al. |
| 2009/0158126 A1 | 6/2009 | Perlmutter et al. |
| 2009/0168524 A1 | 7/2009 | Golov et al. |
| 2009/0172257 A1 | 7/2009 | Prins et al. |
| 2009/0172261 A1 | 7/2009 | Prins et al. |
| 2009/0193184 A1 | 7/2009 | Yu et al. |
| 2009/0199074 A1 | 8/2009 | Sommer et al. |
| 2009/0204824 A1 | 8/2009 | Lin et al. |
| 2009/0204872 A1 | 8/2009 | Yu et al. |
| 2009/0213653 A1 | 8/2009 | Perlmutter et al. |
| 2009/0213654 A1 | 8/2009 | Perlmutter et al. |
| 2009/0225595 A1 | 9/2009 | Kim |
| 2009/0228761 A1 | 9/2009 | Perlmutter et al. |
| 2009/0240872 A1 | 9/2009 | Perlmutter et al. |
| 2009/0265509 A1 | 10/2009 | Klein |
| 2009/0300227 A1 | 12/2009 | Nochimowski et al. |
| 2009/0323412 A1 | 12/2009 | Mokhlesi et al. |
| 2009/0327608 A1 | 12/2009 | Eschmann |
| 2010/0017650 A1 | 1/2010 | Chin et al. |
| 2010/0034022 A1 | 2/2010 | Dutta et al. |
| 2010/0057976 A1 | 3/2010 | Lasser |
| 2010/0061151 A1 | 3/2010 | Miwa et al. |
| 2010/0082883 A1 | 4/2010 | Chen et al. |
| 2010/0083247 A1 | 4/2010 | Kanevsky et al. |
| 2010/0110580 A1 | 5/2010 | Takashima |
| 2010/0124088 A1 | 5/2010 | Shalvi et al. |
| 2010/0131697 A1 | 5/2010 | Alrod et al. |
| 2010/0131827 A1 | 5/2010 | Sokolov et al. |
| 2010/0142268 A1 | 6/2010 | Aritome |
| 2010/0142277 A1 | 6/2010 | Yang et al. |
| 2010/0157675 A1 | 6/2010 | Shalvi et al. |
| 2010/0165689 A1 | 7/2010 | Rotbard et al. |
| 2010/0169547 A1 | 7/2010 | Ou |
| 2010/0169743 A1 | 7/2010 | Vogan et al. |
| 2010/0174847 A1 | 7/2010 | Paley et al. |
| 2010/0195390 A1 | 8/2010 | Shalvi |
| 2010/0199150 A1 | 8/2010 | Shalvi et al. |
| 2010/0211803 A1 | 8/2010 | Lablans |
| 2010/0220509 A1 | 9/2010 | Sokolov et al. |
| 2010/0220510 A1 | 9/2010 | Shalvi |
| 2010/0250836 A1 | 9/2010 | Sokolov et al. |
| 2010/0287217 A1 | 11/2010 | Borchers et al. |
| 2011/0010489 A1 | 1/2011 | Yeh |
| 2011/0060969 A1 | 3/2011 | Ramamoorthy et al. |
| 2011/0066793 A1 | 3/2011 | Burd |
| 2011/0075482 A1 | 3/2011 | Shepard et al. |
| 2011/0107049 A1 | 5/2011 | Kwon et al. |
| 2011/0149657 A1 | 6/2011 | Haratsch et al. |
| 2011/0199823 A1 | 8/2011 | Bar-Or et al. |
| 2011/0302354 A1 | 12/2011 | Miller |

FOREIGN PATENT DOCUMENTS

| | | |
|---|---|---|
| EP | 1605509 A1 | 12/2005 |
| WO | 9610256 A1 | 4/1996 |
| WO | 9828745 A1 | 7/1998 |
| WO | 2002100112 A1 | 12/2002 |
| WO | 03100791 A1 | 12/2003 |
| WO | 2007046084 A2 | 4/2007 |
| WO | 2007132452 A2 | 11/2007 |
| WO | 2007132453 A2 | 11/2007 |
| WO | 2007132456 A2 | 11/2007 |
| WO | 2007132457 A2 | 11/2007 |
| WO | 2007132458 A2 | 11/2007 |
| WO | 2007146010 A2 | 12/2007 |
| WO | 2008026203 A2 | 3/2008 |
| WO | 2008053472 A2 | 5/2008 |
| WO | 2008053473 A2 | 5/2008 |
| WO | 2008068747 A2 | 6/2008 |
| WO | 2008077284 A1 | 7/2008 |
| WO | 2008083131 A2 | 7/2008 |
| WO | 2008099958 A1 | 8/2008 |
| WO | 2008111058 A2 | 9/2008 |
| WO | 2008124760 A2 | 10/2008 |
| WO | 2008139441 A2 | 11/2008 |
| WO | 2009037691 A2 | 3/2009 |
| WO | 2009037697 A2 | 3/2009 |
| WO | 2009038961 A2 | 3/2009 |
| WO | 2009050703 A2 | 4/2009 |
| WO | 2009053961 A2 | 4/2009 |
| WO | 2009053962 A2 | 4/2009 |
| WO | 2009053963 A2 | 4/2009 |
| WO | 2009063450 A2 | 5/2009 |
| WO | 2009072100 A2 | 6/2009 |
| WO | 2009072101 A2 | 6/2009 |
| WO | 2009072102 A2 | 6/2009 |
| WO | 2009072103 A2 | 6/2009 |
| WO | 2009072104 A2 | 6/2009 |
| WO | 2009072105 A2 | 6/2009 |
| WO | 2009074978 A2 | 6/2009 |
| WO | 2009074979 A2 | 6/2009 |
| WO | 2009078006 A2 | 6/2009 |
| WO | 2009095902 A2 | 8/2009 |
| WO | 2011024015 A1 | 3/2011 |

OTHER PUBLICATIONS

U.S. Appl. No. 12/344,233 Official Action dated Jun. 24, 2011.
U.S. Appl. No. 11/995,813 Official Action dated Jun. 16, 2011.
Berman et al., "Mitigating Inter-Cell Coupling Effects in MLC NAND Flash via Constrained Coding", Flash Memory Summit, Santa Clara, USA, Aug. 19, 2010.
U.S. Appl. No. 12/178,318 Official Action dated May 31, 2011.
CN Patent Application # 200780026181.3 Official Action dated Apr. 8, 2011.
US 7,161,836, 01/2007, Wan et al. (withdrawn).
Agrell et al., "Closest Point Search in Lattices", IEEE Transactions on Information Theory, vol. 48, No. 8, pp. 2201-2214, Aug. 2002.
Bez et al., "Introduction to Flash memory", Proceedings of the IEEE, vol. 91, No. 4, pp. 489-502, Apr. 2003.

(56) References Cited

OTHER PUBLICATIONS

Blahut, R.E., "Theory and Practice of Error Control Codes," Addison-Wesley, May 1984, section 3.2, pp. 47-48.
Chang, L., "Hybrid Solid State Disks: Combining Heterogeneous NAND Flash in Large SSDs", ASPDAC, Jan. 2008.
Cho et al., "Multi-Level NAND Flash Memory with Non-Uniform Threshold Voltage Distribution," IEEE International Solid-State Circuits Conference (ISSCC), San Francisco, CA, Feb. 5-7, 2001, pp. 28-29 and 424.
Compaq et al., "Universal Serial Bus Specification", revision 2.0, Apr. 27, 2000.
Databahn™, "Flash memory controller IP", Denali Software, Inc., 1994 https://www.denali.com/en/products/databahn_flash.jsp.
Datalight, Inc., "FlashFX Pro 3.1 High Performance Flash Manager for Rapid Development of Reliable Products", Nov. 16, 2006.
Duann, N., Silicon Motion Presentation "SLC & MLC Hybrid", Flash Memory Summit, Santa Clara, USA, Aug. 2008.
Eitan et al., "Can NROM, a 2-bit, Trapping Storage NVM Cell, Give a Real Challenge to Floating Gate Cells?", Proceedings of the 1999 International Conference on Solid State Devices and Materials (SSDM), pp. 522-524, Tokyo, Japan 1999.
Eitan et al., "Multilevel Flash Cells and their Trade-Offs", Proceedings of the 1996 IEEE International Electron Devices Meeting (IEDM), pp. 169-172, New York, USA 1996.
Engh et al., "A self adaptive programming method with 5 mV accuracy for multi-level storage in FLASH", pp. 115-118, Proceedings of the IEEE 2002 Custom Integrated Circuits Conference, May 12-15, 2002.
Engineering Windows 7, "Support and Q&A for Solid-State Drives", e7blog, May 5, 2009.
Goodman et al., "On-Chip ECC for Multi-Level Random Access Memories," Proceedings of the IEEE/CAM Information Theory Workshop, Ithaca, USA, Jun. 25-29, 1989.
Gotou, H., "An Experimental Confirmation of Automatic Threshold Voltage Convergence in a Flash Memory Using Alternating Word-Line Voltage Pulses", IEEE Electron Device Letters, vol. 18, No. 10, pp. 503-505, Oct. 1997.
Han et al., "An Intelligent Garbage Collection Algorithm for Flash Memory Storages", Computational Science and Its Applications—ICCSA 2006, vol. 3980/2006, pp. 1019-1027, Springer Berlin / Heidelberg, Germany, May 11, 2006.
Han et al., "CATA: A Garbage Collection Scheme for Flash Memory File Systems", Ubiquitous Intelligence and Computing, vol. 4159/2006, pp. 103-112, Springer Berlin / Heidelberg, Aug. 25, 2006.
Hong et al., "Nand Flash-based Disk Cache Using SLC/MLC Combined Flash Memory", 2010 International Workshop on Storage Network Architecture and Parallel I/Os, pp. 21-30, USA, May 3, 2010.
Horstein, "On the Design of Signals for Sequential and Nonsequential Detection Systems with Feedback," IEEE Transactions on Information Theory IT-12:4 (Oct. 1966), pp. 448-455.
How to Resolve Bad Super Block: Magic Number Wrong in BSD, Free Online Articles Director Article Base, posted Sep. 5, 2009.
Huffman, A., "Non-Volatile Memory Host Controller Interface (NVMHCI)", Specification 1.0, Apr. 14, 2008.
Jedec Standard JESD84-C44, "Embedded MultiMediaCard (eMMC) Mechanical Standard, with Optional Reset Signal", Jedec Solid State Technology Association, USA, Jul. 2009.
Jedec, "UFS Specification", version 0.1, Nov. 11, 2009.
Jung et al., in "A 117 mm.sup.2 3.3V Only 128 Mb Multilevel NAND Flash Memory for Mass Storage Applications," IEEE Journal of Solid State Circuits, (11:31), Nov. 1996, pp. 1575-1583.
Kang et al., "A Superblock-based Flash Translation Layer for NAND Flash Memory", Proceedings of the 6th ACM & IEEE International Conference on Embedded Software, pp. 161-170, Seoul, Korea, Oct. 22-26, 2006.
Kawaguchi et al. 1995. A flash-memory based file system. In Proceedings of the USENIX 1995 Technical Conference, New Orleans, Louisiana. 155-164.

Kim et al., "Future Memory Technology including Emerging New Memories", Proceedings of the 24th International Conference on Microelectronics (MIEL), vol. 1, pp. 377-384, Nis, Serbia and Montenegro, May 16-19, 2004.
Lee et al., "Effects of Floating Gate Interference on NAND Flash Memory Cell Operation", IEEE Electron Device Letters, vol. 23, No. 5, pp. 264-266, May 2002.
Maayan et al., "A 512 Mb NROM Flash Data Storage Memory with 8 MB/s Data Rate", Proceedings of the 2002 IEEE International Solid-State circuits Conference (ISSCC 2002), pp. 100-101, San Francisco, USA, Feb. 3-7, 2002.
Mielke et al., "Recovery Effects in the Distributed Cycling of Flash Memories", IEEE 44th Annual International Reliability Physics Symposium, pp. 29-35, San Jose, USA, Mar. 2006.
Micron Technology Inc., "Memory Management in NAND Flash Arrays", Technical Note, year 2005.
Numonyx, "M25PE16: 16-Mbit, page-erasable serial flash memory with byte-alterability, 75 MHz SPI bus, standard pinout", Apr. 2008.
Onfi, "Open NAND Flash Interface Specification," revision 1.0, Dec. 28, 2006.
Panchbhai et al., "Improving Reliability of NAND Based Flash Memory Using Hybrid SLC/MLC Device", Project Proposal for CSci 8980—Advanced Storage Systems, University of Minnesota, USA, Spring 2009.
Park et al., "Sub-Grouped Superblock Management for High-Performance Flash Storages", IEICE Electronics Express, vol. 6, No. 6, pp. 297-303, Mar. 25, 2009.
Phison Electronics Corporation, "PS8000 Controller Specification (for SD Card)", revision 1.2 Document No. S-07018, Mar. 28, 2007.
Shalvi, et al., "Signal Codes," Proceedings of the 2003 IEEE Information Theory Workshop (ITW'2003), Paris, France, Mar. 31-Apr. 4, 2003.
SD Group and SD Card Association, "SD Specifications Part 1 Physical Layer Specification", version 3.01, draft 1.00, Nov. 9, 2009.
Serial ATA International Organization, "Serial ATA Revision 3.0 Specification", Jun. 2, 2009.
Shiozaki, A., "Adaptive Type-II Hybrid Broadcast ARQ System", IEEE Transactions on Communications, vol. 44, Issue 4, pp. 420-422, Apr. 1996.
Suh et al., "A 3.3V 32Mb NAND Flash Memory with Incremental Step Pulse Programming Scheme", IEEE Journal of Solid-State Circuits, vol. 30, No. 11, pp. 1149-1156, Nov. 1995.
St Microelectronics, "Bad Block Management in NAND Flash Memories", Application note AN-1819, Geneva, Switzerland, May 2004.
ST Microelectronics, "Wear Leveling in Single Level Cell NAND Flash Memories," Application note AN-1822 Geneva, Switzerland, Feb. 2007.
Super User Forums, "SD Card Failure, can't read superblock", posted Aug. 8, 2010.
Takeuchi et al., "A Double Level $V_{TH}$ Select Gate Array Architecture for Multi-Level NAND Flash Memories", Digest of Technical Papers, 1995 Symposium on VLSI Circuits, pp. 69-70, Jun. 8-10, 1995.
Takeuchi et al., "A Multipage Cell Architecture for High-Speed Programming Multilevel NAND Flash Memories", IEEE Journal of Solid State Circuits, vol. 33, No. 8, Aug. 1998.
Ubuntu Forums, "Memory Stick Failed IO Superblock", posted Nov. 11, 2009.
Wu et al., "eNVy: A non-Volatile, Main Memory Storage System", Proceedings of the 6th International Conference on Architectural support for programming languages and operating systems, pp. 86-87, San Jose, USA, 1994.
International Application PCT/IL2007/000575 Patentability report dated Mar. 26, 2009.
International Application PCT/IL2007/000575 Search Report dated May 30, 2008.
International Application PCT/IL2007/000576 Patentability Report dated Mar. 19, 2009.
International Application PCT/IL2007/000576 Search Report dated Jul. 7, 2008.
International Application PCT/IL2007/000579 Patentability report dated Mar. 10, 2009.

(56) References Cited

OTHER PUBLICATIONS

International Application PCT/IL2007/000579 Search report dated Jul. 3, 2008.
International Application PCT/IL2007/000580 Patentability Report dated Mar. 10, 2009.
International Application PCT/IL2007/000580 Search Report dated Sep. 11, 2008.
International Application PCT/IL2007/000581 Patentability Report dated Mar. 26, 2009.
International Application PCT/IL2007/000581 Search Report dated Aug. 25, 2008.
International Application PCT/IL2007/001059 Patentability report dated Apr. 19, 2009.
International Application PCT/IL2007/001059 Search report dated Aug. 7, 2008.
International Application PCT/IL2007/001315 search report dated Aug. 7, 2008.
International Application PCT/IL2007/001315 Patentability Report dated May 5, 2009.
International Application PCT/IL2007/001316 Search report dated Jul. 22, 2008.
International Application PCT/IL2007/001316 Patentability Report dated May 5, 2009.
International Application PCT/IL2007/001488 Search report dated Jun. 20, 2008.
International Application PCT/IL2008/000329 Search report dated Nov. 25, 2008.
International Application PCT/IL2008/000519 Search report dated Nov. 20, 2008.
International Application PCT/IL2008/001188 Search Report dated Jan. 28, 2009.
International Application PCT/IL2008/001356 Search Report dated Feb. 3, 2009.
International Application PCT/IL2008/001446 Search report dated Feb. 20, 2009.
U.S. Appl. No. 11/949,135 Official Action dated Oct. 2, 2009.
U.S. Appl. No. 12/019,011 Official Action dated Nov. 20, 2009.
U.S. Appl. No. 11/957,970 Official Action dated May 20, 2010.
U.S. Appl. No. 12/171,797 Official Action dated Aug. 25, 2010.
U.S. Appl. No. 11/945,575 Official Action dated Aug. 24, 2010.
U.S. Appl. No. 12/497,707 Official Action dated Sep. 15, 2010.
U.S. Appl. No. 11/995,801 Official Action dated Oct. 15, 2010.
U.S. Appl. No. 12/045,520 Official Action dated Nov. 16, 2010.
U.S. Appl. No. 12/388,528 Official Action dated Nov. 29, 2010.
U.S. Appl. No. 11/995,814 Official Action dated Dec. 17, 2010.
U.S. Appl. No. 12/251,471 Official Action dated Jan. 3, 2011.
U.S. Appl. No. 12/171,797, filed Jul. 11, 2008.
U.S. Appl. No. 12/251,471, filed Oct. 15, 2008.
U.S. Appl. No. 12/497,707, filed Jul. 06, 2009.
U.S. Appl. No. 12/534,893, filed Aug. 4, 2009.
U.S. Appl. No. 12/534,898, filed Aug. 4, 2009.
U.S. Appl. No. 12/551,583, filed Sep 1, 2009.
U.S. Appl. No. 12/551,567, filed Sep. 1, 2009.
U.S. Appl. No. 12/558,528, filed Sep. 13, 2009.
U.S. Appl. No. 12/579,430, filed Oct. 15, 2009.
U.S. Appl. No. 12/579,432, filed Oct. 15, 2009.
U.S. Appl. No. 12/607,078, filed Oct. 28, 2009.
U.S. Appl. No. 12/607,085, filed Oct. 28, 2009.
U.S. Appl. No. 12/649,358, filed Dec. 30, 2009.
U.S. Appl. No. 12/649,360, filed Dec. 30, 2009.
U.S. Appl. No. 12/688,883, filed Jan. 17, 2010.
U.S. Appl. No. 12/728,296, filed Mar. 22, 2010.
U.S. Appl. No. 12/758,003, filed Apr. 11, 2010.
U.S. Appl. No. 12/880,101, filed Sep. 12, 2010.
U.S. Appl. No. 12/890,724, filed Sep. 27, 2010.
U.S. Appl. No. 12/822,207, filed Jun. 24, 2010.
U.S. Appl. No. 12/987,174, filed Jan. 10, 2011.
U.S. Appl. No. 12/987,175, filed Jan. 10, 2011.
U.S. Appl. No. 13/021,754, filed Feb. 6, 2011.
U.S. Appl. No. 12/534,898 Official Action dated Mar. 23, 2011.
U.S. Appl. No. 13/047,822, filed Mar. 15, 2011.
U.S. Appl. No. 13/069,406, filed Mar. 23, 2011.
U.S. Appl. No. 13/088,361, filed Apr. 17, 2011.
U.S. Appl. No. 12/323,544 Official Action dated Mar. 9, 2012.
Chinese Patent Application # 200780026181.3 Official Action dated Mar. 7, 2012.
Chinese Patent Application # 200780026094.8 Official Action dated Feb. 2, 2012.
U.S. Appl. No. 12/332,370 Official Action dated Mar. 8, 2012.
U.S. Appl. No. 12/579,432 Official Action dated Feb. 29, 2012.
U.S. Appl. No. 12/522,175 Official Action dated Mar. 27, 2012.
U.S. Appl. No. 12/607,085 Official Action dated Mar. 28, 2012.
Budilovsky et al., "Prototyping a High-Performance Low-Cost Solid-State Disk", SYSTOR—The 4th Annual International Systems and Storage Conference, Haifa, Israel, May 30-Jun. 1, 2011.
NVM Express Protocol, "NVM Express", Revision 1.0b, Jul. 12, 2011.
SCSI Protocol, "Information Technology—SCSI Architecture Model—5 (SAM-5)", INCITS document T10/2104-D, revision 01, Jan. 28, 2009.
SAS Protocol, "Information Technology—Serial Attached SCSI—2 (SAS-2)", INCITS document T10/1760-D, revision 15a, Feb. 22, 2009.
U.S. Appl. No. 12/323,544 Office Action dated Dec. 13, 2011.
U.S. Appl. No. 12/332,368 Office Action dated Nov. 10, 2011.
U.S. Appl. No. 12/063,544 Office Action dated Dec. 14, 2011.
U.S. Appl. No. 12/186,867 Office Action dated Jan. 17, 2012.
U.S. Appl. No. 12/119,069 Office Action dated Nov. 14, 2011.
U.S. Appl. No. 12/037,487 Office Action dated Jan. 3, 2012.
U.S. Appl. No. 11/995,812 Office Action dated Oct. 28, 2011.
U.S. Appl. No. 12/551,567 Office Action dated Oct. 27, 2011.
U.S. Appl. No. 12/618,732 Office Action dated Nov. 4, 2011.
U.S. Appl. No. 12/649,382 Office Action dated Jan. 6, 2012.
U.S. Appl. No. 13/284,909, filed Oct. 30, 2011.
U.S. Appl. No. 13/284,913, filed Oct. 30, 2011.
U.S. Appl. No. 13/338,335, filed Dec. 28, 2011.
U.S. Appl. No. 13/355,536, filed Jan. 22, 2012.
Kim et al., "Multi-bit Error Tolerant Caches Using Two-Dimensional Error Coding", Proceedings of the 40th Annual ACM/IEEE International Symposium on Microarchitecture (MICRO-40), Chicago, USA, Dec. 1-5, 2007.
Wei, L., "Trellis-Coded Modulation With Multidimensional Constellations", IEEE Transactions on Information Theory, vol. IT-33, No. 4, pp. 483-501, Jul. 1987.
U.S. Appl. No. 13/114,049 Official Action dated Sep. 12, 2011.
U.S. Appl. No. 12/405,275 Official Action dated Jul. 29, 2011.
Conway et al., "Sphere Packings, Lattices and Groups", 3rd edition, chapter 4, pp. 94-135, Springer, New York, USA 1998.
Chinese Patent Application # 200780040493.X Official Action dated Jun. 15, 2011.
U.S. Appl. No. 12/037,487 Official Action dated Oct. 3, 2011.
U.S. Appl. No. 12/649,360 Official Action dated Aug. 9, 2011.
U.S. Appl. No. 13/192,504, filed Jul. 28, 2011.
U.S. Appl. No. 13/192,852, filed Aug. 2, 2011.
U.S. Appl. No. 13/231,963, filed Sep. 14, 2011.
U.S. Appl. No. 13/239,408, filed Sep. 22, 2011.
U.S. Appl. No. 13/239,411, filed Sep. 22, 2011.
U.S. Appl. No. 13/214,257, filed Aug. 22, 2011.
U.S. Appl. No. 13/192,501, filed Jul. 28, 2011.
U.S. Appl. No. 13/192,495, filed Jul. 28, 2011.

* cited by examiner

MEMORY MANAGEMENT SCHEMES FOR NON-VOLATILE MEMORY DEVICES

CROSS-REFERENCE TO RELATED APPLICATIONS

This application claims the benefit of U.S. Provisional Patent Application 61/326,858, filed Apr. 22, 2010, and U.S. Provisional Patent Application 61/286,814, filed Dec. 16, 2009, whose disclosures are incorporated herein by reference.

FIELD OF THE INVENTION

The present invention relates generally to data storage, and particularly to memory management in non-volatile storage devices.

BACKGROUND OF THE INVENTION

Some storage devices, such as Solid-State Disks (SSD), use arrays of analog memory cells for non-volatile data storage. Each analog memory cell stores a quantity of an analog value, also referred to as a storage value, such as an electrical charge or voltage. This analog value represents the information stored in the cell. In Flash memories, for example, each analog memory cell holds a certain amount of electrical charge. The range of possible analog values is typically divided into intervals, each interval corresponding to one or more data bit values. Data is written to an analog memory cell by writing a nominal analog value that corresponds to the desired bit or bits.

Some memory devices, commonly referred to as Single-Level Cell (SLC) devices, store a single bit of information in each memory cell, i.e., each memory cell can be programmed to assume two possible programming levels. Higher-density devices, often referred to as Multi-Level Cell (MLC) devices, store two or more bits per memory cell, i.e., can be programmed to assume more than two possible programming levels.

SUMMARY OF THE INVENTION

An embodiment of the present invention that is described herein provides a method, including:

storing data in a non-volatile memory that includes multiple memory blocks;

defining at least first and second regions in the non-volatile memory;

defining a first over-provisioning ratio between a first logical address space and a first physical memory space of the first region, and defining a second over-provisioning ratio, different from the first over-provisioning ratio, between a second logical address space and a second physical memory space of the second region;

individually within each of the first and second regions and independently of the other region, compacting portions of the data by copying the portions from one or more source memory blocks to one or more destination memory blocks using the first and second over-provisioning ratios, respectively.

In some embodiments, defining the first and second regions includes assigning the first region for storing parts of the data that change at a first frequency, and assigning the second region for storing portions of the data that change at a second frequency, smaller than the first frequency. In an embodiment, the method includes setting the first over-provisioning ratio to be larger than the second over-provisioning ratio.

In a disclosed embodiment, defining the first and second regions includes assigning the first region for storing frequently-changing data, and assigning the second region for storing rarely-changing data. In another embodiment, the first region is used for storing a computer file that is known to change frequently. In an embodiment, defining the first region includes detecting storage locations of the non-volatile memory in which the computer file is stored.

In some embodiments, defining the first and second regions includes assigning the first region for storing parts of the data that are written sequentially, and assigning the second region for storing portions of the data that are written non-sequentially. In an embodiment, the method includes modifying at least one of the first and second over-provisioning ratios over time. In another embodiment, compacting the portions of the data includes choosing the source memory blocks based on a selection criterion that equalizes wear of the non-volatile memory.

In yet another embodiment, storing the data includes accepting commands to store the data in logical addresses, translating the logical addresses into respective physical storage locations in the non-volatile memory and storing the data in the physical storage locations, and the method includes modifying translation of the logical addresses into the physical storage locations based on a criterion that equalizes wear of the non-volatile memory.

There is additionally provided, in accordance with an embodiment of the present invention, a method, including:

accepting from a host data belonging to a host data-set;

identifying, independently of the host, a portion of the data as belonging to a pre-specified host data-set item;

storing the identified portion in a non-volatile memory using a first number of bits per memory cell; and storing the data other than the identified portion in the non-volatile memory using a second number of bits per memory cell, higher than the first number.

In some embodiments, the host data-set includes computer files, and the pre-specified host data-set item includes a pre-specified computer file. In an embodiment, identifying the portion includes automatically detecting that the portion of the data belongs to the pre-specified host data-set item without receiving from the host any notification that relates the portion of the data to the pre-specified host data-set item.

There is also provided, in accordance with an embodiment of the present invention, a method, including:

in a memory controller that stores data for a host in a memory, defining independently of the host execution priorities for two or more types of memory access tasks to be applied to the memory;

accepting multiple un-prioritized memory access tasks submitted by the host to the memory controller, each of the accepted memory access tasks belonging to a respective one of the types; and applying the accepted memory access tasks to the memory in accordance with the defined execution priorities responsively to the respective types.

In some embodiments, defining the execution priorities includes giving precedence to memory readout tasks over tasks other than the memory readout tasks. In a disclosed embodiment, defining the execution priorities includes giving precedence to the memory access tasks relating to selected storage addresses over the memory access tasks relating to storage addresses other than the selected storage addresses. In another embodiment, defining the execution priorities includes giving precedence to the memory access tasks relating to a selected file type over the memory access tasks relating to file types other than the selected file type.

In yet another embodiment, defining the execution priorities includes causing the memory controller to execute a sequence of consecutive memory access tasks belonging to a given type. In an embodiment, causing the memory controller to execute the sequence includes queuing subsets of the memory access tasks belonging to the respective types in respective type-specific queues, and executing the sequence of the consecutive memory access tasks drawn from one of the type-specific queues. In an embodiment, defining the execution priorities includes modifying the execution priorities over time.

There is further provided, in accordance with an embodiment of the present invention, a method, including:

accepting from a host a computer file, and storing the computer file in a non-volatile memory;

identifying, automatically and independently of the host, a region of the non-volatile memory that holds a portion of the computer file that is not utilized by the host; and releasing the identified region for use in management of the non-volatile memory while continuing to hold the computer file in the non-volatile memory.

In some embodiments, the computer file indicates attributes of other computer files stored in the non-volatile memory, and identifying the region includes identifying null entries in the computer file. In a disclosed embodiment, releasing the region includes assigning the released region to serve as over-provisioning memory space.

There is additionally provided, in accordance with an embodiment of the present invention, apparatus, including:

an interface, which is configured to accept data for storage in a non-volatile memory; and a processor, which is configured to define at least first and second regions in the non-volatile memory, to define a first over-provisioning ratio between a first logical address space and a first physical memory space of the first region, to define a second over-provisioning ratio, different from the first over-provisioning ratio, between a second logical address space and a second physical memory space of the second region, and, individually within each of the first and second regions and independently of the other region, to compact portions of the data by copying the portions from one or more source memory blocks to one or more destination memory blocks using the first and second over-provisioning ratios, respectively.

There is also provided, in accordance with an embodiment of the present invention, apparatus, including:

an interface, which is configured to accept from a host data belonging to a host data-set for storage in a non-volatile memory; and a processor, which is configured to identify, independently of the host, a portion of the data as belonging to a pre-specified host data-set item, to store the identified portion in the non-volatile memory using a first number of bits per memory cell, and to store the data other than the identified portion in the non-volatile memory using a second number of bits per memory cell, higher than the first number.

There is further provided, in accordance with an embodiment of the present invention, apparatus, including:

an interface, which is configured to accept from a host memory access tasks for execution in a memory; and a processor, which is configured to define, independently of the host, execution priorities for two or more types of the memory access tasks, to accept multiple un-prioritized memory access tasks submitted by the host, each of the accepted memory access tasks belonging to a respective one of the types, and to apply the accepted memory access tasks to the memory in accordance with the defined execution priorities responsively to the respective types.

There is also provided, in accordance with an embodiment of the present invention, apparatus, including:

an interface, which is configured to accept from a host a computer file for storage in a non-volatile memory; and a processor, which is configured to store the computer file in the non-volatile memory, to identify, automatically and independently of the host, a region of the non-volatile memory that holds a portion of the computer file that is not utilized by the host, and to release the identified region for use in management of the non-volatile memory while continuing to hold the computer file in the non-volatile memory.

The present invention will be more fully understood from the following detailed description of the embodiments thereof, taken together with the drawings in which:

DETAILED DESCRIPTION OF EMBODIMENTS

Overview

Embodiments of the present invention provide improved methods and systems for memory management in memory systems comprising non-volatile memory devices. Although the embodiments described herein refer mainly to management of Solid State Disks (SSDs) by SSD controllers, the disclosed techniques can be applied in various other kinds of memory systems and by various other types of memory controllers.

In some of the disclosed techniques, a memory controller stores data in a non-volatile memory that includes multiple memory blocks. The memory controller applies a compaction ("garbage collection") process that copies valid data from partially-filled memory blocks to new storage locations in order to clear memory blocks for erasure and new programming. In some embodiments, the memory controller defines two or more regions in the non-volatile memory, and carries out the compaction process separately and independently in each region. In an embodiment, the memory controller maintains different over-provisioning ratios (i.e., different ratios between the true physical capacity and of the memory and the capacity available to the host) in different regions. This technique is useful, for example, for assigning a high over-provisioning ratio to regions that store frequently-changing data, and a lower over-provisioning ratio to regions that store rarely-changing data.

In other disclosed techniques, the memory controller accepts from a host data belonging to one or more computer files or other host data-set items. The memory controller automatically identifies a portion of the data as belonging to a file (or other host data-set item) that is pre-specified as sensitive, such as an operating system Master File Table (MFT) or File Allocation Table (FAT) file whose corruption may have severe consequences on system performance. The memory controller stores the identified portion robustly using a relatively small number of bits per cell, and stores the data other than the identified portion using a higher number of bits per cell. The memory controller typically identifies the data portion in question independently of the host, i.e., without receiving any notification from the host that relates the data portion to the sensitive file.

In some disclosed techniques, the memory controller accepts memory access tasks (referred to as "threads") for execution from the host. The memory controller assigns execution priorities to the threads, independently of the host, and executes the threads in accordance with the execution priorities. The memory controller may apply various policies using the execution priorities, such as giving precedence to readout commands over other commands or giving precedence to selected memory regions over others.

In other disclosed techniques, the memory controller accepts one or more computer files from the host, and stores the files in the non-volatile memory. The memory controller identifies, automatically and independently from the host, a memory region holding data that logically belongs to one of the files but is not actually utilized by the host. In an example embodiment, the file comprises a MFT or FAT file, and the identified region comprises one or more NULL entries in the file. Having identified the unutilized region, the memory controller releases the region for use in memory management, such as for increasing the over-provisioning overhead.

System Description

Figure 1:
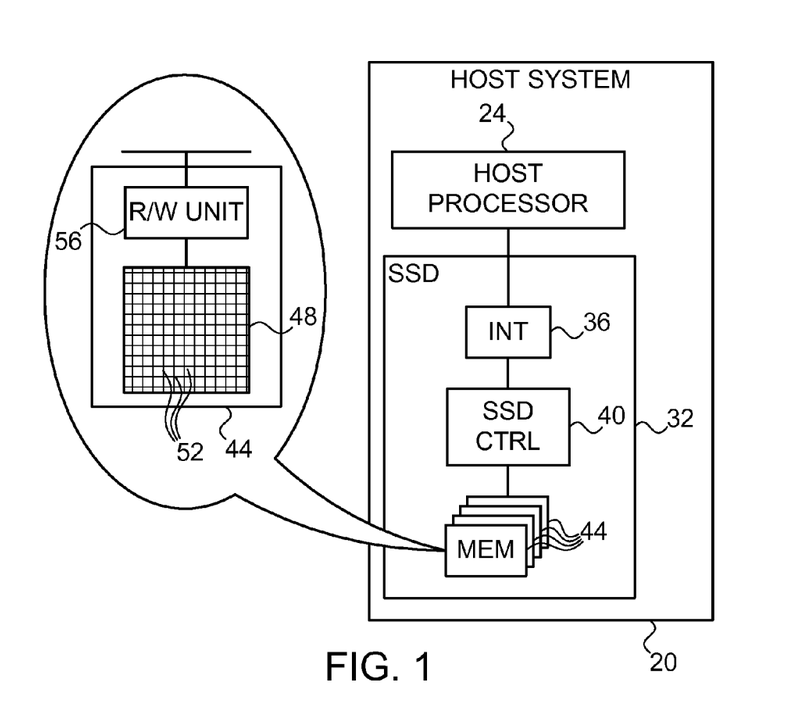
FIG. 1 is a block diagram that schematically illustrates a memory system, in accordance with an embodiment of the present invention.

FIG. 1 is a block diagram that schematically illustrates a host system 20, in accordance with an embodiment of the present invention. In the present example, system 20 comprises a mobile computing device such as a notebook or laptop computer. Alternatively, the methods and systems described herein can be used in other computing devices such as Personal Digital Assistants (PDAs), in mobile communication terminals such as mobile phones, or in any other suitable host system.

Host system 20 comprises a host processor 24. The host processor typically runs a certain Operating System (OS), and may run any desired number of software applications. Host system 20 comprises a non-volatile storage device, in the present example a Solid-State Disk (SSD) 32. SSD 32 comprises a host interface 36 for communicating with host processor 24, an SSD controller 40, and one or more non-volatile memory devices 44. Each memory device 44 comprises an array 48 of multiple analog memory cells 52. A Read/Write (R/W) unit 56 writes data into memory cells 52 of array 48, and retrieves data from the memory cells.

In the context of the present patent application and in the claims, the term "analog memory cell" is used to describe any memory cell that holds a continuous, analog value of a physical parameter, such as an electrical voltage or charge. Array 48 may comprise analog memory cells of any kind, such as, for example, NAND, NOR and Charge Trap Flash (CTF) Flash cells, phase change RAM (PRAM, also referred to as Phase Change Memory—PCM), Nitride Read Only Memory (NROM), Ferroelectric RAM (FRAM), magnetic RAM (MRAM) and/or Dynamic RAM (DRAM) cells. Flash memory devices are described, for example, by Bez et al., in "Introduction to Flash Memory," Proceedings of the IEEE, volume 91, number 4, April, 2003, pages 489-502, which is incorporated herein by reference. Multi-level Flash cells and devices are described, for example, by Eitan et al., in "Multilevel Flash Cells and their Trade-Offs," Proceedings of the 1996 IEEE International Electron Devices Meeting (IEDM), New York, N.Y., pages 169-172, which is incorporated herein by reference. The paper compares several kinds of multilevel Flash cells, such as common ground, DINOR, AND, NOR and NAND cells.

NROM cells are described by Eitan et al., in "Can NROM, a 2-bit, Trapping Storage NVM Cell, Give a Real Challenge to Floating Gate Cells?" Proceedings of the 1999 International Conference on Solid State Devices and Materials (SSDM), Tokyo, Japan, Sep. 21-24, 1999, pages 522-524, which is incorporated herein by reference. NROM cells are also described by Maayan et al., in "A 512 Mb NROM Flash Data Storage Memory with 8 MB/s Data Rate," Proceedings of the 2002 IEEE International Solid-State Circuits Conference (ISSCC 2002), San Francisco, Calif., Feb. 3-7, 2002, pages 100-101, which is incorporated herein by reference. FRAM, MRAM and PRAM cells are described, for example, by Kim and Koh in "Future Memory Technology including Emerging New Memories," Proceedings of the $24^{th}$ International Conference on Microelectronics (MIEL), Nis, Serbia and Montenegro, May 16-19, 2004, volume 1, pages 377-384, which is incorporated herein by reference.

The charge levels stored in memory cells 52 and/or the analog voltages or currents written into and read out of the memory cells are referred to herein collectively as analog values or storage values. The storage values may comprise threshold voltages, electrical charge levels, or any other suitable kind of storage values. R/W unit 56 stores data in the analog memory cells by programming the cells to assume respective memory states, which are also referred to as programming levels. The programming levels are selected from a finite set of possible levels, and each level corresponds to a certain nominal storage value. For example, a 2 bit/cell MLC can be programmed to assume one of four possible programming levels by writing one of four possible nominal storage values into the cell. Typically, R/W unit 56 converts data for storage in the memory device to analog storage values, and writes them into memory cells 52. When reading data out of array 48, R/W unit 56 converts the storage values of memory cells 52 into digital samples. Data is typically written to and read from the memory cells in groups that are referred to as pages. The R/W unit erases a block of cells 52 by applying one or more negative erasure pulses to the cells.

Some or all of the functions of SSD controller 40 may be implemented in hardware. Alternatively, SSD controller 40 may comprise a microprocessor that runs suitable software, or a combination of hardware and software elements. In some embodiments, SSD controller 40 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

The configuration of FIG. 1 is an exemplary system configuration, which is shown purely for the sake of conceptual clarity. Any other suitable memory system configuration can also be used. Elements that are not necessary for understanding the principles of the present invention have been omitted from the figure for clarity. In the example system configuration shown in FIG. 1, memory devices 44 and SSD controller 40 are implemented as two separate Integrated Circuits (ICs). In alternative embodiments, however, the memory devices and the SSD controller may be integrated on separate semiconductor dies in a single Multi-Chip Package (MCP) or System on Chip (SoC), and may be interconnected by an internal bus. Further alternatively, some or all of the SSD circuitry may reside on the same die on which one or more of the memory devices are disposed. Further alternatively, some or all of the functionality of SSD controller 40 can be implemented in software and carried out by host processor 24. In some embodiments, host processor 24 and SSD controller 40 may be fabricated on the same die, or on separate dies in the same device package.

In an example configuration of array 48, memory cells 52 are arranged in multiple rows and columns, and each memory cell comprises a floating-gate transistor. The gates of the transistors in each row are connected by word lines, and the sources of the transistors in each column are connected by bit lines. The memory array is typically divided into multiple pages, i.e., groups of memory cells that are programmed and read simultaneously. Pages are sometimes sub-divided into sectors. In some embodiments, each page comprises an entire row of the array. In alternative embodiments, each row (word line) can be divided into two or more pages. For example, in some devices each row is divided into two pages, one comprising the odd-order cells and the other comprising the even-order cells. In a typical implementation, a two-bit-per-cell memory device may have four pages per row, a three-bit-per-cell memory device may have six pages per row, and a four-bit-per-cell memory device may have eight pages per row.

Erasing of cells is usually carried out in blocks that contain multiple pages. Typical memory devices may comprise several thousand erasure blocks. In some two-bit-per-cell MLC devices, each erasure block is on the order of thirty-two word lines, each comprising several tens of thousands of memory cells. Each word line of such a device is often partitioned into four pages (odd/even order cells, least/most significant bit of the cells). Three-bit-per cell devices having thirty-two word lines per erasure block would have 192 pages per erasure block, and four-bit-per-cell devices would have 256 pages per block. Alternatively, other block sizes and configurations can also be used. Some memory devices comprise two or more separate memory cell arrays, often referred to as planes. Since each plane has a certain "busy" period between successive write operations, data can be written alternately to the different planes in order to increase programming speed.

Typically, host processor 24 reads and writes data in SSD 32 by specifying logical addresses of the data (e.g., using Logical Block Addressing—LBA). SSD controller 40 translates the logical addresses into respective physical storage locations in memory devices 44. Typically, the host processor is unaware of the actual physical storage locations in which the data is stored, and the logical-to-physical address translation may change over time.

Independent Memory Block Compaction in Separate Memory Regions

In some embodiments, each memory array 48 is partitioned into multiple memory blocks, each block comprises multiple pages, and SSD controller 40 stores data by writing data pages into the memory. In a typical Flash memory, data can be programmed page-by-page, but erasure can only be performed on entire blocks. Therefore, SSD controller 40 typically uses logical-to-physical address translation. In such a scheme, storage commands received from host processor 24 typically specify logical addresses. SSD controller 40 translates the logical addresses into physical storage locations in memory devices 44.

In particular, when the data of a certain logical page is updated, the SSD controller writes the new data in a new physical page (since the old physical page holding the old data of that logical page cannot be erased individually). Over time, more and more physical pages in the memory blocks of SSD 32 gradually become invalid, since their data was updated and stored in other physical pages.

SSD controller 40 typically applies a compaction process, which copies valid data from partially-filled memory blocks (referred to as source blocks) to new physical locations (referred to as destination blocks) in a compact manner. The compaction process, which is also referred to as "garbage collection," reduces regions of invalid data in the memory blocks and clears memory blocks for erasure and new programming.

In order to increase the efficiency of the garbage collection process, SSD 32 is typically over-provisioned in terms of memory size. In other words, the actual physical storage capacity of the SSD is larger than the specified logical capacity available to host processor 24. The aggregated size of the memory areas that do not hold valid data ("holes") is referred to as an over-provisioning overhead. The over-provisioning overhead can be specified as an over-provisioning ratio, which is defined as a fraction of the specified system capacity. For example, when the SSD uses an over-provisioning ratio of 5% and the memory is full from the host's perspective, each memory block is only 95% programmed, on average.

When SSD 32 is over-provisioned, garbage collection can be performed more efficiently. In other words, the number of copy operations per block compaction can be reduced. The efficiency of the garbage collection process increases as a function of the over-provisioning ratio used in the system. Thus, increasing the over-provisioning ratio reduces the wearing of memory cells, and also increases the programming throughput. The effect of the over-provisioning overhead on cell wearing and storage throughput is particularly strong when the memory is full or nearly full.

In some embodiments of the present invention, SSD controller 40 defines two or more separate regions in memory devices 44, and carries out a separate and independent compaction process within each region. Each region comprises multiple blocks, and may be defined in a single memory device 44 or in multiple memory devices 44. Any desired number of regions may be defined. The regions may be specified in terms of logical or physical addresses. Typically, SSD controller 40 maintains different over-provisioning ratios in different regions.

Figure 2:
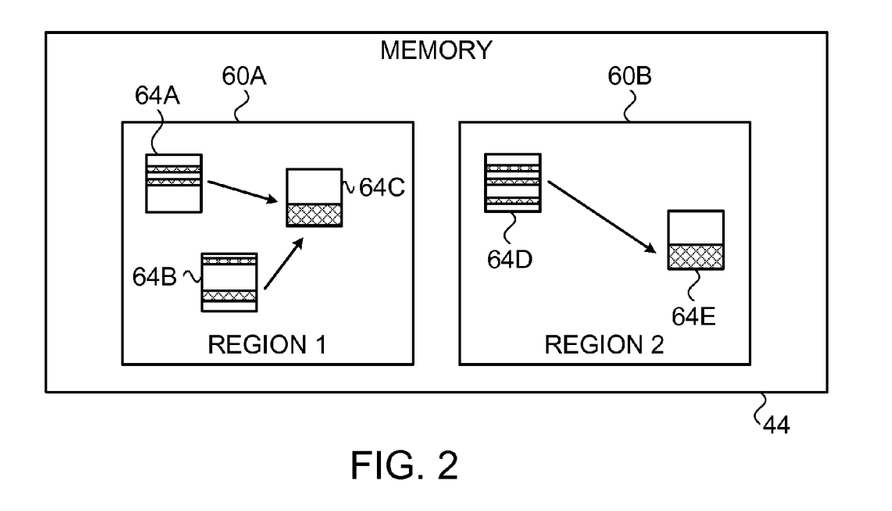
FIG. 2 is a diagram that schematically illustrates a process of compacting memory blocks, in accordance with an embodiment of the present invention.

FIG. 2 is a diagram that schematically illustrates a process of compacting memory blocks, in accordance with an embodiment of the present invention. In the present example, SSD controller 44 defines two memory regions denoted 60A and 60B in a certain memory device 44. Each region comprises multiple memory blocks. SSD controller 40 performs memory block compaction ("garbage collection") separately in each of the two regions, independently of the compaction process carried out in the other region. In the example of FIG. 2, in region 60A the SSD controller compacts two source blocks 64A and 64B into a destination block 64C. In region 60B, the SSD controller compacts a source block 64D into a destination block 64E.

Applying compaction separately in different regions, and in particular setting different over-provisioning ratios in different regions, may improve the performance of SSD 32. For example, different data types may have different characteristics, which can be exploited by matching the over-provisioning ratio to the data type.

In an example embodiment, SSD controller 40 may define one region for storing data that changes frequently, and another region for data that changes rarely. The SSD controller may set a relatively high over-provisioning ratio in the region holding the frequently-changing data, and a relatively low over-provisioning ratio in the region holding the rarely-changing data. Matching the over-provisioning ratio to the frequency at which the data changes provides an improved compromise between storage capacity and storage throughput. Although the example above refers to two regions (holding frequently-changing and rarely-changing data), the SSD controller may alternatively define three or more regions corresponding to three or more update frequencies of the data. Each such region may be provided with a different over-provisioning ratio.

In an embodiment, SSD controller 40 defines one region for storing data that is written in a sequential manner, i.e., to blocks of data that are written to successive storage addresses, and another region for data that is written non-sequentially. The SSD controller may assign different over-provisioning ratios to the two regions, e.g., a lower over-provisioning ratio to the region holding sequentially-written data.

In some embodiments, SSD controller 40 adapts the over-provisioning ratios of different memory regions over time in an adaptive manner. For example, the SSD controller may track the frequency-of-use of various memory regions over time, and assign each memory region a respective over-provisioning ratio based on the current frequency-of-use of that region. Further aspects of adaptive over-provisioning are addressed in U.S. patent application Ser. No. 12/822,207, which is assigned to the assignee of the present patent application and whose disclosure is incorporated herein by reference.

In some embodiments, certain computer files that are used by the OS of host processor 24 are modified frequently. Frequently-changing files may comprise, for example, File System (FS) files that indicate file storage locations and other file attributes in the host processor's file system. Such files may comprise, for example, a Master File Table (MFT) or File Allocation Table (FAT) file. As another example, files that store e-mail messages, calendar entries and related information also change frequently. Such files may comprise, for example, Personal Storage Table (PST) or Offline Storage Table (OST) files.

In some embodiments, SSD controller 40 recognizes a certain file as a frequently changing file, and assigns a high over-provisioning ratio to the memory region in SSD 32 in which this file is stored. The SSD controller may recognize any of the file type examples given above, or any other suitable type of file that changes frequently. Memory regions that hold other files are assigned lower over-provisioning ratios.

In some embodiments, SSD controller automatically identifies the memory region in which the file in question is stored, e.g., by detecting a file header or other characteristic that is indicative of the sought file. The automatic identification in these embodiments is performed by the SSD controller without any indication or guidance from host processor 24 as to the storage location of the file. In alternative embodiments, SSD controller 40 recognizes the file by accepting an indication from host processor 24 as to the storage location of the file.

Figure 3:
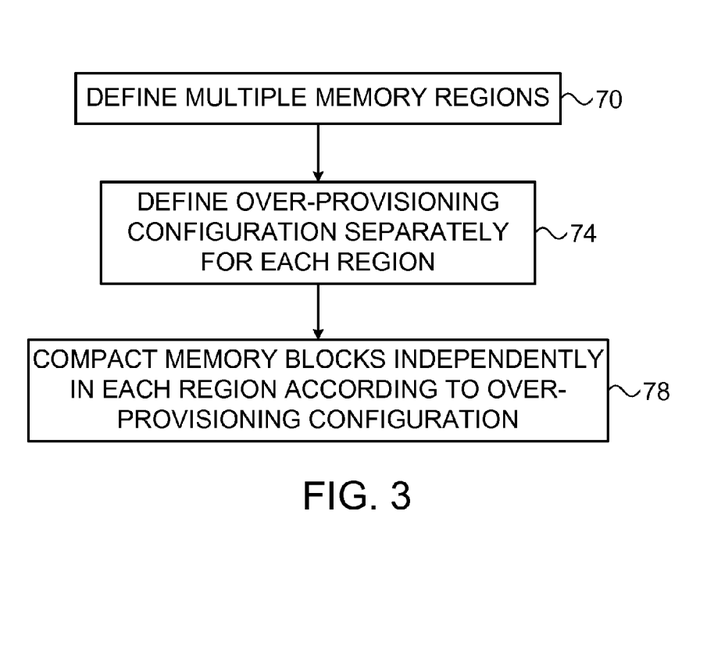
FIG. 3 is a flow chart that schematically illustrates a method for compacting memory blocks, in accordance with an embodiment of the present invention.

FIG. 3 is a flow chart that schematically illustrates a method for compacting memory blocks, in accordance with an embodiment of the present invention. The method begins with SSD controller 40 defining multiple memory regions in memory devices 44, at a region definition step 70. The SSD controller defines a separate over-provisioning configuration for each memory region, at an over-provisioning definition step 74. The SSD controller compacts memory blocks independently in each region, at a compaction step 78. The compaction in each region is performed in accordance using the over-provisioning overhead defined for that region, and independently of the compaction that takes place in other regions.

When carrying out the compaction process in a given region, SSD controller 40 may choose memory blocks for compaction using any suitable criterion. In an embodiment, the SSD controller chooses memory blocks for compaction depending on the wear level and/or endurance of the memory blocks. For example, the SSD controller may prefer to compact memory blocks that have gone through relatively few Programming and Erasure (P/E) cycles, and which are expected to have high endurance.

In some embodiments, the SSD controller modifies the logical-to-physical address mapping in order to equalize the wear levels of the different physical memory blocks. For example, if certain LBAs are updated frequently, the SSD controller may re-map these LBAs to other physical memory blocks, in order to equalize the wearing of memory cells.

Reliable Storage of Sensitive Files

Some computer files used by the OS of host processor 24 may be sensitive to errors. Errors in some files may have severe consequences on the host system functionality or performance. Sensitive files may comprise, for example, file-system files such as MFT and FAT files, e-mail files such as PST and OST files, or any other suitable file.

(Some host systems may use various kinds of host data-sets that specify data-set items, not necessarily file systems that specify computer files. Host data-set items may comprise, for example, a file, a data structure, or any other suitable data item. In a given host data-set, certain data-set items may be regarded as sensitive. Although the example embodiments described herein refer mainly to computer files, the disclosed techniques can be used for reliable storage of any other suitable kind of host data-set items in any other suitable kind of host data-set.)

In some embodiments, SSD controller 40 automatically identifies incoming data that belongs to a file that is pre-specified as sensitive, and stores this data in a robust manner that is resilient to errors. This identification is carried out independently of the host, i.e., without relying on any notification from the host that relates the data to the sensitive file. For example, the SSD controller may store sensitive files using a small number of bits per cell, in comparison with the number of bits per cell used for storing other data. In an example embodiment, the SSD controller may store the data of a sensitive file at a density of one or two bits-per-cell, and store other data at a density of three bits-per-cell.

Figure 4:
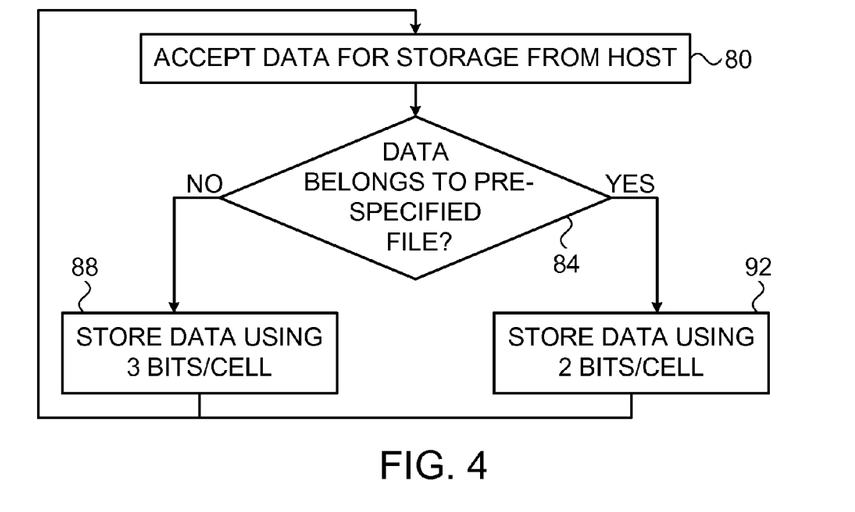
FIG. 4 is a flow chart that schematically illustrates a method for data storage, in accordance with an embodiment of the present invention.

FIG. 4 is a flow chart that schematically illustrates a method for data storage, in accordance with an embodiment of the present invention. The method begins with SSD controller 40 accepts data for storage from host processor 24, at a data input step 80. The SSD controller checks whether the accepted data belongs to a sensitive file that was pre-specified for robust storage, at a checking step 84. If the data does not belong to a sensitive file, the SSD controller stores the data at a density of three bits-per-cell, at a normal storage step 88. If, on the other hand, the data is identified as belonging to a pre-specified sensitive file, the SSD controller stores the data at a density of two bits-per-cell, at a robust storage step 92.

The SSD controller may identify incoming data as belonging to a sensitive file using any suitable method, e.g., by identifying a file header or other characteristic data pattern.

Host-Independent Prioritization of Memory Access Tasks

In some embodiments, host processor 24 sends multiple memory access tasks to SSD controller 40 for execution in SSD 32. Each memory access task is referred to as a tag or thread, and may comprise, for example, a read command or a write command. The terms "memory access task," "task," "tag" and "thread" are all used interchangeably herein. The host processor sends subsequent threads without waiting for completion of previous threads, and the SSD controller has certain flexibility in defining the thread execution order.

In some embodiments, SSD controller 40 assigns execution priorities to incoming threads independently of the host, and executes the threads in SSD 32 in accordance with the assigned execution priorities. In some embodiments, each memory access task is of a certain type, and the SSD controller assigns the priority of each memory access task based on its type.

In an embodiment, SSD controller 40 assigns a high priority to readout tasks (i.e., to memory access tasks that request data readout from the memory), and lower priority to other tasks (e.g., programming tasks and status request tasks). In these embodiments, when multiple tasks are pending, the SSD controller gives precedence to execution of pending readout tasks. In many system configurations it is advantageous to give high priority to readout tasks, since the requested data may be needed for immediate use by the host system. Programming tasks are often less sensitive to delay, for example because the data to be programmed is already cached.

In another embodiment, the SSD controller assigns high priority to tasks relating to certain storage addresses. In an example embodiment, the SSD controller assigns high priority to one or more ranges of Logical Block Addresses (LBAs), and lower priorities to other LBAs. Memory access tasks relating to the high-priority LBAs will be executed first, at the expense of higher execution latency for memory access tasks relating to other LBAs.

In yet another embodiment, SSD controller 40 assigns high priority to tasks relating to certain files or file types. High-priority files may comprise, for example, file-system files such as MFT or FAT files, e-mail files such as PST or OST files, or any other suitable file type. SSD controller 40 will execute tasks relating to the high-priority files first, at the expense of higher execution latency for tasks relating to other files.

In alternative embodiments, SSD controller 40 may assign priorities to memory access tasks independently of the host processor based on any other suitable criteria. In some embodiments, the SSD controller may modify the priorities adaptively over time. For example, the SSD controller may identify, e.g., using statistical analysis, which memory regions are most important to the host processor, and increase the relative priority of tasks relating to these regions.

Figure 5:
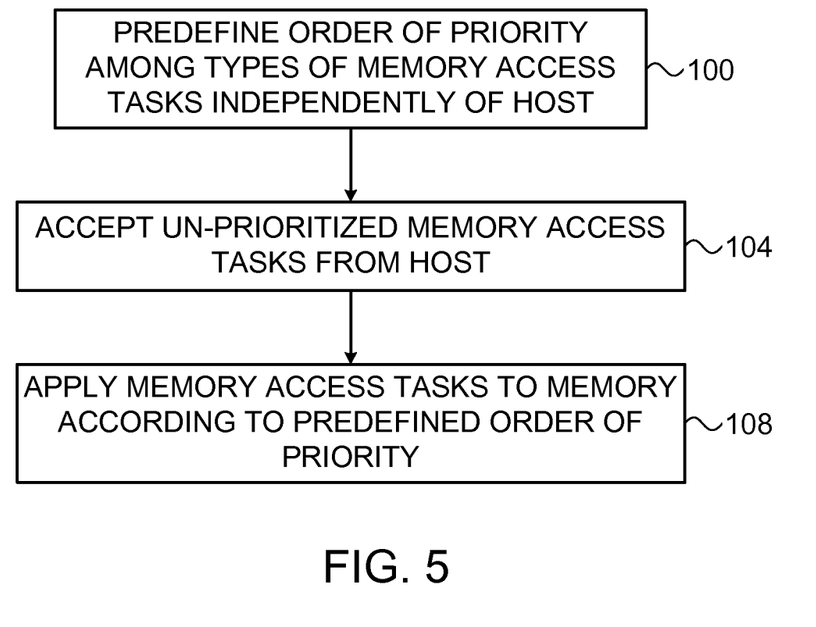
FIG. 5 is a flow chart that schematically illustrates a method for prioritized access to memory, in accordance with an embodiment of the present invention.

FIG. 5 is a flow chart that schematically illustrates a method for prioritized access to memory, in accordance with an embodiment of the present invention. The method begins with SSD controller 40 defining execution priorities for different types of memory access tasks, at a priority definition step 100. The SSD controller assigns the execution priorities independently of the host processor.

SSD controller 40 accepts from host processor 24 memory access tasks for execution in SSD 32, at a task input step 104. Each accepted task belongs to one of the above-defined types, and the host processor typically does not define execution priorities for the tasks. SSD controller 40 executes the accepted tasks in SSD 32, at a task execution step 108. The SSD controller executes the tasks in accordance with the execution priorities defined at step 100 above.

In some embodiments, SSD 32 is highly efficient in executing sequences of read commands or sequences of write commands, but is less efficient in executing sequences of intermixed read and write commands. In some embodiments, SSD controller 40 prioritizes the execution of memory access tasks such that multiple tasks of the same type (e.g., multiple readout tasks or multiple programming tasks) are executed consecutively. As a result, the overall throughput and efficiency of SSD 32 is improved.

In some embodiments, SSD controller 40 applies this sort of prioritization by queueing readout commands and programming commands in separate queues, and then selecting between the queues based on a certain selection criterion. The criterion typically causes the SSD controller to execute multiple readout tasks consecutively, or multiple programming tasks consecutively.

Figure 6:
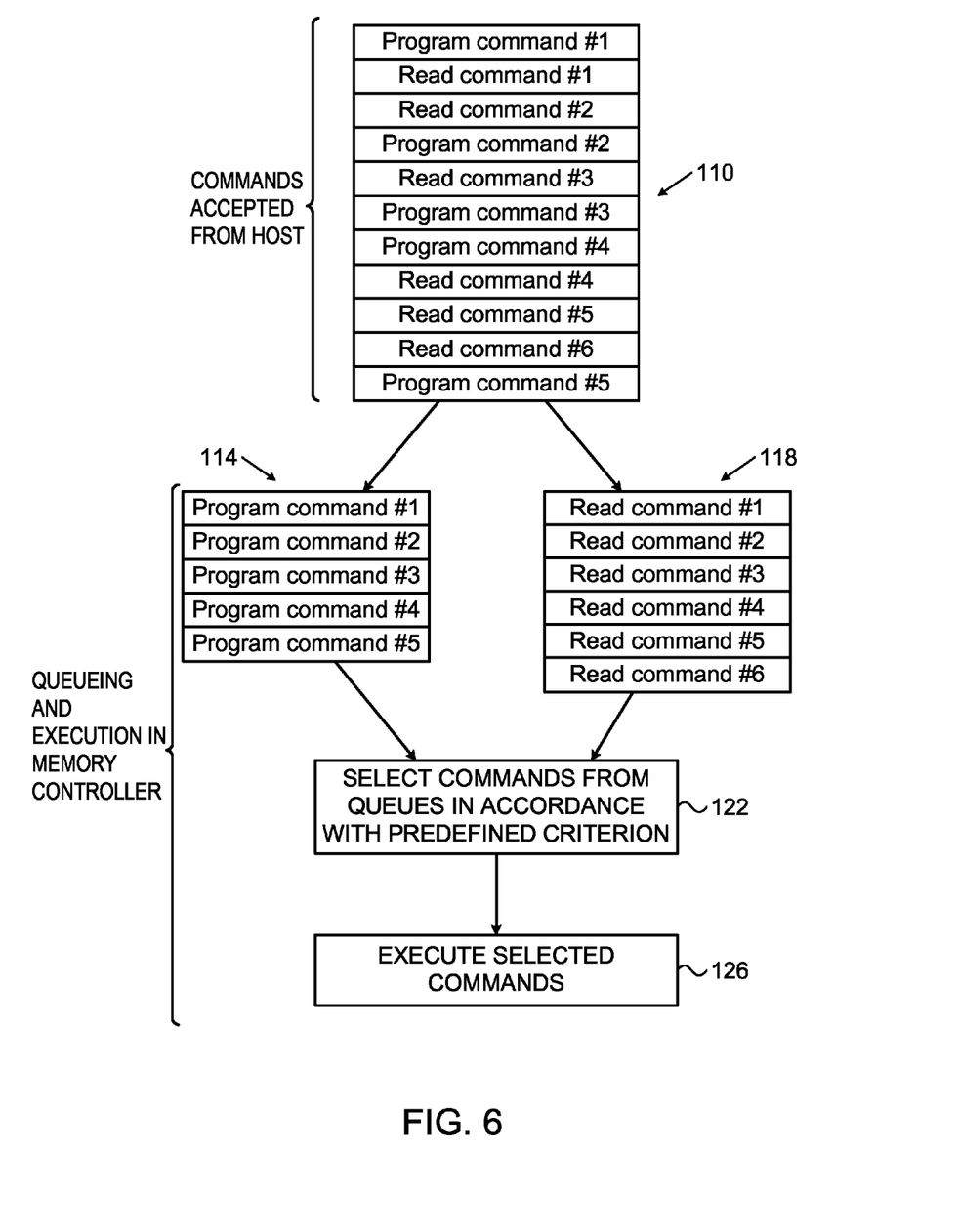
FIG. 6 is a diagram that schematically illustrates a process of prioritized execution of programming commands and read commands, in accordance with an embodiment of the present invention.

FIG. 6 is a diagram that schematically illustrates a process of prioritized execution of programming commands and read commands, in accordance with an embodiment of the present invention. A list 110 shows a sequence of memory access tasks in the order they are provided to SSD controller 40 by host processor 24. The example list comprises five programming commands and six readout commands.

SSD controller 40 separates the readout commands from the programming commands, and stores the programming commands in a write queue 114 and the readout commands in a read queue 118. At a selection step 122, the SSD controller selects the next task for execution from one of queues 114 and 118.

The selection criterion typically forms sequences of programming commands, and/or sequences of readout commands. For example, the selection criterion may define an order that serves M successive programming commands from queue 114, then N successive readout commands from queue 118, and so on. Selection of M and N enables setting of various trade-offs between execution efficiency and amount of re-ordering. Selection of M and N also enables setting different relative priority for readout commands vs. programming commands. At an execution step 126, the SSD controller executes the commands selected from the two queues.

As noted above, in some embodiments the SSD controller gives precedence to execution of readout tasks over other tasks. The queuing configuration of FIG. 6 can be used to implement this sort of prioritization, as well.

Host-Independent Trimming of Unused Memory Regions

In some embodiments, host processor 24 sends computer files for storage in SSD 32, and SSD controller 40 stores the files in memory devices 44. In some practical scenarios, some portions of the computer files are not actually utilized by the host processor. In some cases, certain regions in memory devices 44 logically belong to a valid computer file but do not contain data that is actually utilized by the host processor. In other cases, a file has been deleted (or rewritten to different logical addresses) by the host, leaving behind unutilized memory regions. In some embodiments, SSD controller 40 automatically identifies such unutilized memory regions, and releases ("trims") them for use in memory management while continuing to hold the file in question in memory.

For example, in some embodiments the host processor stores a MFT or FAT file, which indicates storage locations and other attributes of files stored in SSD 32. Real-life MFT and FAT files often comprise many NULL entries that do not represent any active file. The NULL entries occupy storage space, but are not actually accessed by the host processor.

In some embodiments, SSD controller 40 automatically identifies the storage locations used for storing the MFT or FAT file, and identifies the NULL entries in the file. The identification of the storage locations and NULL entries is typically performed by the SSD controller independently of the host processor, i.e., without using any indication from the host processor as to the storage locations or NULL entries of the file.

Having identified the memory regions that hold the unutilized portions of the file, SSD controller 40 releases these memory regions for use in memory management. The released memory regions can be used, for example, as an additional over-provisioning overhead, or for any other suitable memory management function.

Although the embodiments described herein refer to MFT or FAT files, the disclosed technique can be used to release unutilized memory areas that logically belong to any other suitable file.

Figure 7:
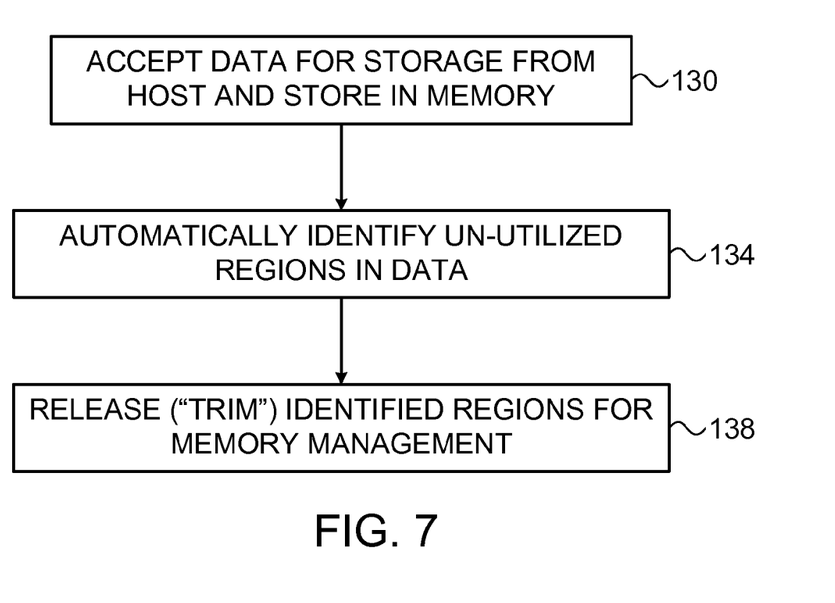
FIG. 7 is a flow chart that schematically illustrates a method for automatic releasing of unutilized memory regions, in accordance with an embodiment of the present invention.

FIG. 7 is a flow chart that schematically illustrates a method for automatic releasing of unutilized memory regions, in accordance with an embodiment of the present invention. The method begins with SSD controller 40 accepting from host processor 24 data of one or more computer files for storage in SSD 32, at a file input step 130. The SSD controller stores the accepted data in memory devices 44.

The SSD controller automatically identifies memory regions that hold portions of the files that are not utilized by the host processor, at a region identification step 134. This identification is typically carried out independently of the host processor. The SSD controller then releases ("trims") the identified memory regions, at a trimming step 138. The released memory regions are made available for increasing the over-provisioning ratio in SSD 32, or for carrying out any other memory management task by SSD controller 40.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
   storing data in a non-volatile memory that includes multiple memory blocks;
   defining at least first and second regions in the non-volatile memory;
   defining a first over-provisioning ratio between a first logical address space and a first physical memory space of the first region, and defining a second over-provisioning ratio, different from the first over-provisioning ratio, between a second logical address space and a second physical memory space of the second region;
   individually within each of the first and second regions and independently of the other region, compacting portions of the data by copying the portions from one or more source memory blocks to one or more destination memory blocks using the first and second over-provisioning ratios, respectively.

2. The method according to claim 1, wherein defining the first and second regions comprises assigning the first region for storing parts of the data that change at a first frequency, and assigning the second region for storing portions of the data that change at a second frequency, smaller than the first frequency.

3. The method according to claim 2, and comprising setting the first over-provisioning ratio to be larger than the second over-provisioning ratio.

4. The method according to claim 2, wherein defining the first and second regions comprises assigning the first region for storing frequently-changing data, and assigning the second region for storing rarely-changing data.

5. The method according to claim 2, wherein the first region is used for storing a computer file that is known to change frequently.

6. The method according to claim 5, wherein defining the first region comprises detecting storage locations of the non-volatile memory in which the computer file is stored.

7. The method according to claim 1, wherein defining the first and second regions comprises assigning the first region for storing parts of the data that are written sequentially, and assigning the second region for storing portions of the data that are written non-sequentially.

8. The method according to claim 1, and comprising modifying at least one of the first and second over-provisioning ratios over time.

9. The method according to claim 1, wherein compacting the portions of the data comprises choosing the source memory blocks based on a selection criterion that equalizes wear of the non-volatile memory.

10. The method according to claim 1, wherein storing the data comprises accepting commands to store the data in logical addresses, translating the logical addresses into respective physical storage locations in the non-volatile memory and storing the data in the physical storage locations, and comprising modifying translation of the logical addresses into the physical storage locations based on a criterion that equalizes wear of the non-volatile memory.

11. Apparatus, comprising:
   an interface, which is configured to accept data for storage in a non-volatile memory; and
   a processor, which is configured to define at least first and second regions in the non-volatile memory, to define a first over-provisioning ratio between a first logical address space and a first physical memory space of the first region, to define a second over-provisioning ratio, different from the first over-provisioning ratio, between a second logical address space and a second physical memory space of the second region, and, individually within each of the first and second regions and independently of the other region, to compact portions of the data by copying the portions from one or more source memory blocks to one or more destination memory blocks using the first and second over-provisioning ratios, respectively.

12. The apparatus according to claim 11, wherein the processor is configured to assign the first region for storing parts of the data that change at a first frequency, and to assign the second region for storing portions of the data that change at a second frequency, smaller than the first frequency.

13. The apparatus according to claim 12, wherein the processor is configured to set the first over-provisioning ratio to be larger than the second over-provisioning ratio.

14. The apparatus according to claim 12, wherein the processor is configured to assign the first region for storing frequently-changing data, and to assign the second region for storing rarely-changing data.

15. The apparatus according to claim 12, wherein the first region is used for storing a computer file that is known to change frequently.

16. The apparatus according to claim 15, wherein the processor is configured to detect storage locations of the non-volatile memory in which the computer file is stored.

17. The apparatus according to claim 11, wherein the processor is configured to assign the first region for storing parts of the data that are written sequentially, and to assign the second region for storing portions of the data that are written non-sequentially.

18. The apparatus according to claim 11, wherein the processor is configured to modify at least one of the first and second over-provisioning ratios over time.

19. The apparatus according to claim 11, wherein the processor is configured to choose the source memory blocks for compaction based on a selection criterion that equalizes wear of the non-volatile memory.

20. The apparatus according to claim 11, wherein the processor is configured to accept commands to store the data in logical addresses, to translate the logical addresses into respective physical storage locations in the non-volatile memory, to store the data in the physical storage locations, and to modify translation of the logical addresses into the physical storage locations based on a criterion that equalizes wear of the non-volatile memory.

* * * * *